(12) United States Patent
Kasatani

(10) Patent No.: US 9,232,004 B2
(45) Date of Patent: *Jan. 5, 2016

(54) NETWORK SYNCHRONIZATION SYSTEM AND INFORMATION PROCESSING DEVICE

(71) Applicant: Kiyoshi Kasatani, Kanagawa (JP)

(72) Inventor: Kiyoshi Kasatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,869

(22) Filed: Oct. 21, 2014

(65) Prior Publication Data

US 2015/0039736 A1  Feb. 5, 2015

Related U.S. Application Data

(60) Continuation of application No. 13/067,077, filed on May 6, 2011, now Pat. No. 8,897,323, which is a division of application No. 12/382,502, filed on Mar. 18, 2009, now Pat. No. 7,961,761.

(30) Foreign Application Priority Data

Mar. 18, 2008  (JP) ................. 2008-070380

(51) Int. Cl.
  *H04L 12/24* (2006.01)
  *H04L 29/08* (2006.01)
  *H04N 1/00* (2006.01)

(52) U.S. Cl.
  CPC .......... *H04L 67/1095* (2013.01); *H04L 41/082* (2013.01); *H04L 67/125* (2013.01); *H04L 67/34* (2013.01); *H04N 1/00344* (2013.01); *H04N 1/00973* (2013.01)

(58) Field of Classification Search
  CPC ....................................... H04L 41/082
  USPC ........................... 370/503, 464, 498
  See application file for complete search history.

(56) References Cited

U.S. PATENT DOCUMENTS 5,758,355 A * 5/1998 Buchanan .............................. 1/1
6,275,570 B1 * 8/2001 Homan et al. ............. 379/88.17
(Continued)

FOREIGN PATENT DOCUMENTS

EP      1788478 A2    5/2007
JP      2007067830 A  3/2007

OTHER PUBLICATIONS

Extended European Search report dated Jul. 21, 2009 corresponding to EP Application No. EP 09155519.

*Primary Examiner* — Andrew Lai
*Assistant Examiner* — Andrew C Lee
(74) *Attorney, Agent, or Firm* — Harness, Dickey & Pierce, PLC

(57) ABSTRACT

In a network synchronization system including plural information processing devices, a first information processing device includes a synchronization-use common storage unit configured to copy and store first information for each user authorized to use the first information processing device, so that the first information can be shared with another information processing device; and a second information processing device includes a setting information unit configured to store second information for each user authorized to use the second information processing device, and a synchronization control unit configured to compare the second information with the first information, and to update the second information to latest information based on a result of the comparison. The synchronization control unit acquires common update information common to the information processing devices, which is stored in the synchronization-use common storage unit.

5 Claims, 26 Drawing Sheets

(56) References Cited

U.S. PATENT DOCUMENTS

| | | | |
|---|---|---|---|
| 6,374,259 B1* | 4/2002 | Celik | 1/1 |
| 6,393,421 B1* | 5/2002 | Paglin | 1/1 |
| 6,609,162 B1 | 8/2003 | Shimizu et al. | |
| 6,941,291 B1* | 9/2005 | Zoller et al. | 1/1 |
| 6,966,059 B1 | 11/2005 | Shetty et al. | |
| 6,996,326 B2 | 2/2006 | Koshino et al. | |
| 7,002,702 B1 | 2/2006 | Machida | |
| 7,266,566 B1* | 9/2007 | Kennaley et al. | 1/1 |
| 7,391,743 B2 | 6/2008 | Momozono et al. | |
| 8,085,417 B2* | 12/2011 | Funamizu | 358/1.15 |
| 8,233,594 B2* | 7/2012 | Vaghar et al. | 379/88.18 |
| 8,280,913 B2* | 10/2012 | Bergin | 707/793 |
| 8,345,297 B2* | 1/2013 | Kawabuchi et al. | 358/1.16 |
| 8,868,577 B2* | 10/2014 | Wei et al. | 707/756 |
| 8,942,433 B2* | 1/2015 | Small | 382/116 |
| 2002/0004800 A1* | 1/2002 | Kikuta et al. | 707/500 |
| 2004/0109436 A1 | 6/2004 | Vargas et al. | |
| 2004/0167813 A1* | 8/2004 | Robertson et al. | 705/8 |
| 2004/0260953 A1 | 12/2004 | Jamieson et al. | |
| 2005/0012953 A1 | 1/2005 | Fujishige et al. | |
| 2005/0243364 A1* | 11/2005 | Sakai | 358/1.15 |
| 2005/0246299 A1* | 11/2005 | Scarborough et al. | 706/21 |
| 2006/0026434 A1* | 2/2006 | Yoshida et al. | 713/182 |
| 2006/0190553 A1 | 8/2006 | Kojima | |
| 2006/0230137 A1* | 10/2006 | Gare et al. | 709/224 |
| 2007/0046976 A1 | 3/2007 | Kasatani | |
| 2007/0046977 A1 | 3/2007 | Kasatani | |
| 2007/0046988 A1 | 3/2007 | Kasatani | |
| 2007/0047847 A1 | 3/2007 | Kasatani | |
| 2007/0050378 A1 | 3/2007 | Kasatani | |
| 2007/0050460 A1 | 3/2007 | Kasatani | |
| 2007/0182982 A1 | 8/2007 | Hayashida et al. | |
| 2007/0216943 A1* | 9/2007 | Funamizu | 358/1.15 |
| 2008/0015998 A1* | 1/2008 | Celik | 705/51 |
| 2008/0016582 A1 | 1/2008 | Morimoto | |
| 2008/0227489 A1* | 9/2008 | Huh | 455/556.1 |
| 2008/0232368 A1 | 9/2008 | Ikegami et al. | |
| 2009/0006652 A1 | 1/2009 | Kasatani | |
| 2009/0007232 A1 | 1/2009 | Kasatani | |
| 2009/0135446 A1 | 5/2009 | Kawabuchi et al. | |

* cited by examiner

FIG.3

INDIVIDUAL SETTING INFORMATION

| USER ID (UNIQUE) | 01a |
|---|---|
| FURIGANA | りこうたろう (PRONOUNCED AS RICOH TARO) |
| DIVISION | DEVELOPMENT DIVISION |
| INDIVIDUAL NAME (UNIQUE) | 理光太郎 (PRONOUNCED AS RICOH TARO) |
| USER NAME (UNIQUE) | TARO |
| PASSWORD | XXXXX |
| IC CARD NUMBER | 001 |
| Windows USER NAME | TARO |
| Windows USER PASSWORD | ☐☐☐☐☐ |

FIG.4A

REGISTERED USER INFORMATION

| USER ID | USER NAME | INDIVIDUAL NAME | LAST LOGIN DATE | LAST-UPDATE DATE | IC CARD NO. | INDIVIDUAL SETTING FILE |
|---------|-----------|-----------------|-----------------|------------------|-------------|-------------------------|
| 01a | TARO | 理光太郎 (PRONOUNCED AS RICOH TARO) | 1/10 | 1/12 | 001 | 01a |
| 02a | JIRO | 理光次郎 (PRONOUNCED AS RICOH JIRO) | 1/10 | 1/12 | 002 | 02a |
| 03a | SABURO | 理光三郎 (PRONOUNCED AS RICOH SABURO) | 1/10 | 1/12 | 003 | 03a |

FIG.4B

DELETED USER INFORMATION

| USER ID | DELETED DATE |
|---------|--------------|
| 04a | 1/9 |
| 05a | 1/11 |
|  |  |
|  |  |

FIG.4C

SAME-USER INFORMATION

| GUID | USER ID |
|------|---------|
| A01 | 01a |
| A02 | 02a |
| A03 | 03a |
| A04 | 04a |
| A05 | 05a |
| A01 | 01b |
| A02 | 02b |
| A03 | 03b |
| A04 | 04b |
| A05 | 05b |

FIG.4D

USER AUTHENTICATION INFORMATION

| USER ID | REMOTE USER ID |
|---------|----------------|
| 01a | 01b |
| 02a | 02b |
| 03a | 03b |
| 04a | 04b |
| 05a | 05b |

FIG.5

SYNCHRONIZATION SETTING INFORMATION

LAST-UPDATE DATE SETTING

| LAST-UPDATE TIME/DATE | MONTH/DATE/HOUR/MINUTE |

NETWORK SYNCHRONIZATION SETTING

| (PERFORM OR DO NOT PERFORM) NETWORK SYNCHRONIZATION | PERFORM |
|---|---|
| DISCLOSE (OR DO NOT DISCLOSE) SYNCHRONIZATION-USE COMMON FOLDER | DISCLOSE |
| NETWORK PATH | /*/* |
| LOGIN USER NAME | TARO |
| LOGIN PASSWORD | XXXXX |
| AUTOMATIC SYNCHRONIZATION INTERVAL | 24 HOURS |

FIG.7

MFP 2b

REGISTERED USER INFORMATION

| USER ID | USER NAME | INDIVIDUAL SETTING FILE |
|---|---|---|
| 01b | TARO | File01b |
| 02b | JIRO | File02b |

SAME-USER INFORMATION

| GUID | USER ID |
|---|---|
|  |  |
|  |  |

USER AUTHENTICATION INFORMATION

| USER ID | REMOTE USER ID |
|---|---|
|  |  |
|  |  |

DELETED USER INFORMATION

| USER ID | DELETED DATE |
|---|---|
|  |  |
|  |  |

MFP 2a

REGISTERED USER INFORMATION

| USER ID | USER NAME | INDIVIDUAL SETTING FILE |
|---|---|---|
| 01a | TARO | File01a |

SAME-USER INFORMATION

| GUID | USER ID |
|---|---|
|  |  |
|  |  |

USER AUTHENTICATION INFORMATION

| USER ID | REMOTE USER ID |
|---|---|
|  |  |
|  |  |

DELETED USER INFORMATION

| USER ID | DELETED DATE |
|---|---|
|  |  |
|  |  |

FIG.8

MFP 2b

REGISTERED USER INFORMATION

| USER ID | USER NAME | INDIVIDUAL SETTING FILE |
|---|---|---|
| 01b | TARO | File01b |
| 02b | JIRO | File02b |

SAME-USER INFORMATION

| GUID | USER ID |
|---|---|
| A01 | 01b |
| A01 | 01a |

USER AUTHENTICATION INFORMATION

| USER ID | REMOTE USER ID |
|---|---|
| | |
| | |

DELETED USER INFORMATION

| USER ID | DELETED DATE |
|---|---|
| | |
| | |

---

MFP 2a

REGISTERED USER INFORMATION

| USER ID | USER NAME | INDIVIDUAL SETTING FILE |
|---|---|---|
| 01a | TARO | File01b |
| 02b | JIRO | File02b |

SAME-USER INFORMATION

| GUID | USER ID |
|---|---|
| | |
| | |

USER AUTHENTICATION INFORMATION

| USER ID | REMOTE USER ID |
|---|---|
| 01a | 01b |
| | |

DELETED USER INFORMATION

| USER ID | DELETED DATE |
|---|---|
| | |
| | |

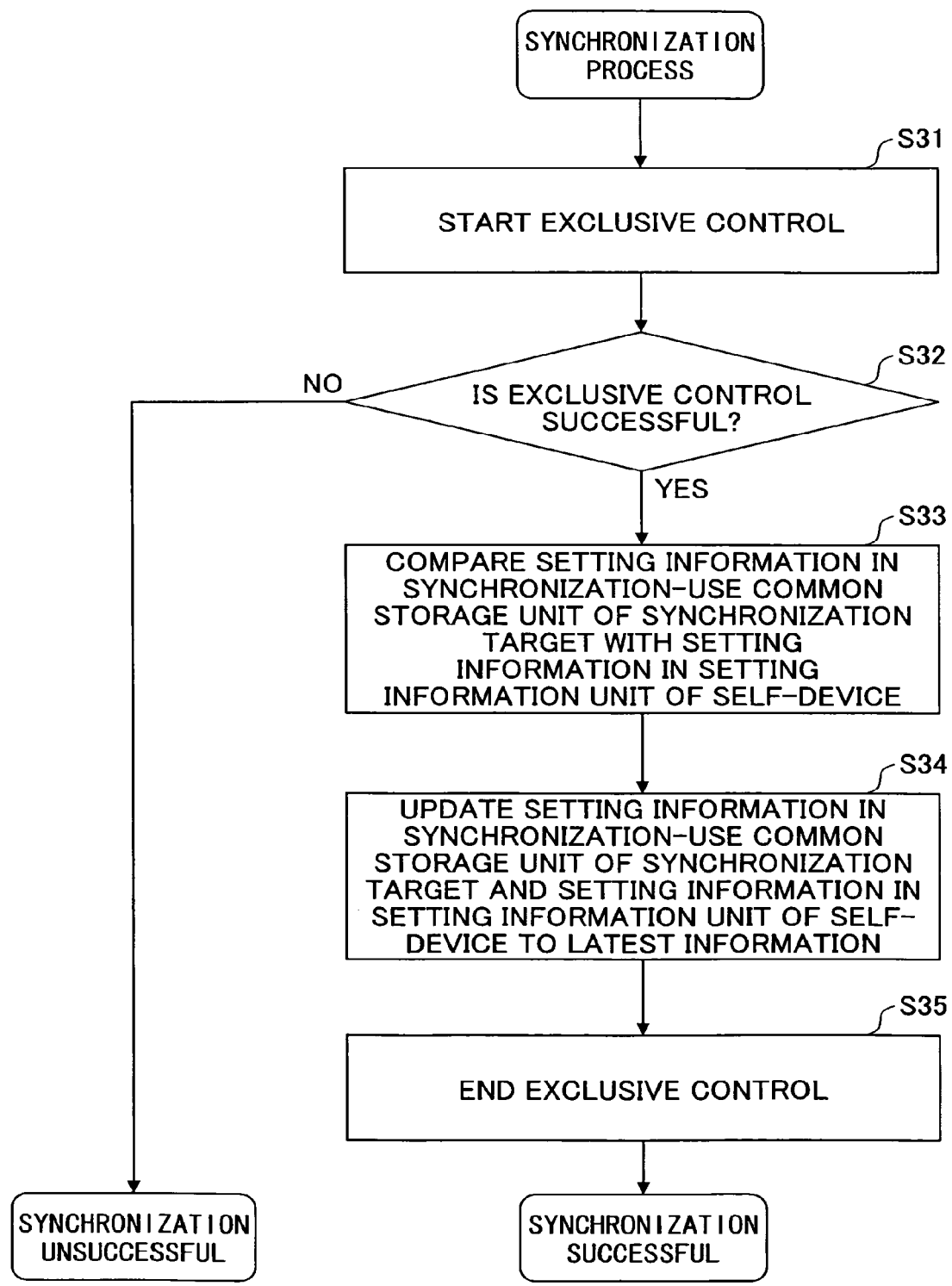

FIG.13

MFP 2b

REGISTERED USER INFORMATION

| USER ID | USER NAME | LAST-UPDATE DATE | INDIVIDUAL SETTING FILE |
|---|---|---|---|
| 03b | SABURO | 1/19 | File03b |
| 04b | SHIRO | 1/17 | File04b |

DELETED USER INFORMATION

| USER ID | DELETED DATE |
|---|---|
|  |  |
|  |  |
|  |  |

SAME-USER INFORMATION

| GUID | USER ID |
|---|---|
|  |  |
|  |  |
|  |  |

USER AUTHENTICATION INFORMATION

| USER ID | REMOTE USER ID |
|---|---|
|  |  |
|  |  |
|  |  |

MFP 2a

REGISTERED USER INFORMATION

| USER ID | USER NAME | LAST-UPDATE DATE | INDIVIDUAL SETTING FILE |
|---|---|---|---|
| 03a | SABURO | 1/18 | File03a |
| 04a | SHIRO | 1/18 | File04a |

DELETED USER INFORMATION

| USER ID | DELETED DATE |
|---|---|
|  |  |
|  |  |
|  |  |

SAME-USER INFORMATION

| GUID | USER ID |
|---|---|
|  |  |
|  |  |
|  |  |

USER AUTHENTICATION INFORMATION

| USER ID | REMOTE USER ID |
|---|---|
|  |  |
|  |  |
|  |  |

FIG. 14

MFP 2b

REGISTERED USER INFORMATION

| USER ID | USER NAME | LAST-UPDATE DATE | INDIVIDUAL SETTING FILE |
|---|---|---|---|
| 03b | SABURO | 1/19 | File03b |
| 04b | SHIRO | 1/18 | File04a |

DELETED USER INFORMATION

| USER ID | DELETED DATE |
|---|---|
|  |  |
|  |  |

SAME-USER INFORMATION

| GUID | USER ID |
|---|---|
| A03 | 03b |
| A03 | 03a |
| A04 | 04b |
| A04 | 04a |

USER AUTHENTICATION INFORMATION

| USER ID | REMOTE USER ID |
|---|---|
|  |  |
|  |  |

---

MFP 2a

REGISTERED USER INFORMATION

| USER ID | USER NAME | LAST-UPDATE DATE | INDIVIDUAL SETTING FILE |
|---|---|---|---|
| 03a | SABURO | 1/19 | File03b |
| 04a | SHIRO | 1/18 | File04a |

DELETED USER INFORMATION

| USER ID | DELETED DATE |
|---|---|
|  |  |
|  |  |

SAME-USER INFORMATION

| GUID | USER ID |
|---|---|
|  |  |
|  |  |

USER AUTHENTICATION INFORMATION

| USER ID | REMOTE USER ID |
|---|---|
| 03a | 03b |
| 04a | 04b |

FIG.15

MFP 2b

REGISTERED USER INFORMATION

| USER ID | USER NAME | LAST LOGIN DATE | LAST-UPDATE DATE | INDIVIDUAL SETTING FILE |
|---|---|---|---|---|

DELETED USER INFORMATION

| USER ID | DELETED DATE |
|---|---|
| 03b | 1/16 |
| 04a | 1/16 |

SAME-USER INFORMATION

| GUID | USER ID |
|---|---|
| A03 | 03b |
| A03 | 03a |
| A04 | 04b |
| A04 | 04a |

USER AUTHENTICATION INFORMATION

| USER ID | REMOTE USER ID |
|---|---|
| | |
| | |

MFP 2a

REGISTERED USER INFORMATION

| USER ID | USER NAME | LAST LOGIN DATE | LAST-UPDATE DATE | INDIVIDUAL SETTING FILE |
|---|---|---|---|---|
| 03a | SABURO | 1/17 | 1/19 | File03b |
| 04a | SHIRO | 1/15 | 1/18 | File04a |

DELETED USER INFORMATION

| USER ID | DELETED DATE |
|---|---|
| | |
| | |

SAME-USER INFORMATION

| GUID | USER ID |
|---|---|
| | |
| | |

USER AUTHENTICATION INFORMATION

| USER ID | REMOTE USER ID |
|---|---|
| 03a | 03b |
| 04a | 04b |

MFP 2b

REGISTERED USER INFORMATION

| USER ID | USER NAME | LAST LOGIN DATE | LAST-UPDATE DATE | INDIVIDUAL SETTING FILE |
|---------|-----------|-----------------|------------------|-------------------------|
| 03a | SABURO | 1/17 | 1/19 | File03b |

SAME-USER INFORMATION

| GUID | USER ID |
|------|---------|
| A03 | 03b |
| A03 | 03a |
| A04 | 04b |
| A04 | 04a |

USER AUTHENTICATION INFORMATION

| USER ID | REMOTE USER ID |
|---------|----------------|
|  |  |
|  |  |

DELETED USER INFORMATION

| USER ID | DELETED DATE |
|---------|--------------|
| 04b | 1/16 |
|  |  |
|  |  |

MFP 2a

REGISTERED USER INFORMATION

| USER ID | USER NAME | LAST LOGIN DATE | LAST-UPDATE DATE | INDIVIDUAL SETTING FILE |
|---------|-----------|-----------------|------------------|-------------------------|
| 03a | SABURO | 1/17 | 1/19 | File03b |

SAME-USER INFORMATION

| GUID | USER ID |
|------|---------|
|  |  |
|  |  |
|  |  |

USER AUTHENTICATION INFORMATION

| USER ID | REMOTE USER ID |
|---------|----------------|
| 03a | 03b |
| 04a | 04b |

DELETED USER INFORMATION

| USER ID | DELETED DATE |
|---------|--------------|
|  |  |
|  |  |

SYNCHRONIZATION SETTING INFORMATION

LAST-UPDATE DATE SETTING

| LAST-UPDATE TIME/DATE | MONTH/DATE/HOUR/MINUTE |
|---|---|

NETWORK SYNCHRONIZATION SETTING

| (PERFORM OR DO NOT PERFORM) NETWORK SYNCHRONIZATION | PERFORM |
|---|---|
| DISCLOSE (OR DO NOT DISCLOSE) SYNCHRONIZATION-USE COMMON FOLDER | DISCLOSE |
| NETWORK PATH | /*/* |
| LOGIN USER NAME | TARO |
| LOGIN PASSWORD | XXXXX |
| AUTOMATIC SYNCHRONIZATION INTERVAL | 24 HOURS |

SETTINGS PERTAINING TO UPDATE INFORMATION

| (PERFORM OR DO NOT PERFORM) AUTOMATIC DOWNLOAD | PERFORM |
|---|---|
| DOWNLOAD METHOD (VIA DOWNLOAD SERVER OR VIA NETWORK SYNCHRONIZATION) | VIA NETWORK SYNCHRONIZATION |
| AUTOMATIC EXECUTION INTERVAL | 24 HOURS |
| (PERFORM OR DO NOT PERFORM) AUTOMATIC UPDATE | DO NOT PERFORM |
| (PERFORM OR DO NOT PERFORM) MANUAL UPDATE | PERFORM |
| VERSION SELECTION (SELECT FROM DOWNLOADED VERSION) | |
| REFLECT VERSION SELECTION IN NETWORK SYNCHRONIZATION (REFLECT OR DO NOT REFLECT) | REFLECT |
| NOTIFY DOWNLOAD/UPLOAD BY E-MAIL (NOTIFY OR DO NOT NOTIFY) | NOTIFY |
| SUBJECT | * * * * |
| TEXT | * * * * |

SETTINGS FOR AUTOMATIC REBOOT

| (PERFORM OR DO NOT PERFORM) AUTOMATIC REBOOT | PERFORM |
|---|---|
| AUTOMATIC REBOOT TIME | 04:00 |

FORM IMAGE

SEND FILE

FILE NAME /
SUBJECT NAME : BBB

STORE

DOCUMENT NAME : CCC
(CATEGORY NAME)

NETWORK SYNCHRONIZATION SYSTEM AND INFORMATION PROCESSING DEVICE

CROSS-REFERENCE TO RELATED APPLICATIONS

This application is a continuation of U.S. application Ser. No. 13/067,077, filed May 6, 2011, now U.S. Pat. No. 8,897,323, which is a divisional of U.S. Ser. No. 12/382,502, filed Mar. 18, 2009, now U.S. Pat. No. 7,961,761, which claims the benefit of Japanese Patent Application No. 2008-070380, filed Mar. 18, 2008. The disclosures of the above applications are herein incorporated by reference in their entirety.

BACKGROUND OF THE INVENTION

1. Field of the Invention

The present invention relates to a network synchronization system and an information processing device.

2. Description of the Related Art

The recent years have witnessed the development of an information processing system including an information processing device connected to a network, which performs communications with plural information devices to exchange documents in various data formats by applying plural communication protocols.

In such an information processing system, various application services are provided through the information processing device. The various application services include sending an image obtained by scanning an original document or data created by an information device to a specified destination by e-mail, sending this information by facsimile transmission, and transferring files containing this information to an information device; and recording/outputting the text of a received e-mail or an image of a file attached to the e-mail, sending this information to a specified fax machine, and transferring files containing this information to an information device; and storing/managing data in the information processing device.

However, such an information processing device needs to be connected with plural information devices via a network. When plural devices that require authentication are separately provided in the network and each of the devices has a function of identifying an individual and allowing only a registered user to use the device, the user needs to input a user name and a password for each of the devices, which is not user-friendly. One approach is to integrate the devices in the system, so that only a single user name and a single password are required. However, when the authentication information is already being separately managed, enormous costs would be incurred in order to establish a system for managing the authentication information in an integrated manner.

The invention disclosed in patent document 1 is a network communications system including a document input/output device providing a function of identifying an individual by an authentication operation performed with an operations unit and allowing only a registered user to use the device, and plural external devices which are connected via a network, providing a function of identifying individuals with a protocol of the network.

The document input/output device according to the invention of patent document 1 is capable of automatically authenticating external devices. Specifically, in order to execute all of the authentication operations of the authentication units that are separately provided in the external devices, only one authentication operation needs to be performed with the operations unit of the document input/output device.

Patent Document 1: Japanese Laid-Open Patent Application No. 2007-67830

When developing a network communications system including plural information processing devices such as the document input/output device disclosed in patent document 1, the following aspect is preferably addressed. For example, in a network communications system including information processing devices used by staff members belonging to a certain organization in a company, the setting information items such as user information items that are registered in the respective information processing devices are preferably the same (in synchronization).

However, with the conventional technology, enormous costs would be required to establish such a system, i.e., a system for managing the setting information set in the respective devices in an integrated manner.

SUMMARY OF THE INVENTION

The present invention provides a network synchronization system and an information processing device in which one or more of the above-described disadvantages are eliminated.

A preferred embodiment of the present invention provides a network synchronization system and an information processing device, with which setting information can be effectively synchronized among plural information processing devices.

According to an aspect of the present invention, there is provided a network synchronization system including plural information processing devices, wherein a first information processing device among the plural information processing devices includes a synchronization-use common storage unit configured to copy and store first individual setting information for each user registered as being authorized to use the first information processing device, so that the first individual setting information can be shared with another one of the plural information processing devices other than the first information processing device; and a second information processing device among the plural information processing devices includes a setting information unit configured to store second individual setting information for each user registered as being authorized to use the second information processing device, and a synchronization control unit configured to compare the second individual setting information for each user stored in the setting information unit with the first individual setting information for the corresponding user stored in the synchronization-use common storage unit, and to update the second individual setting information to latest individual setting information for each user based on a result of the comparison, wherein the synchronization control unit acquires common update information that is common to the plural information processing devices, wherein the common update information is stored in the synchronization-use common storage unit.

According to an aspect of the present invention, there is provided an information processing device included in a network synchronization system including plural information processing devices, the information processing device including a setting information unit configured to store first individual setting information for each user registered as being authorized to use the information processing device; and a synchronization control unit configured to compare the first individual setting information for each user stored in the setting information unit with second individual setting information for the corresponding user stored in a synchronization-use common storage unit included in another one of the plural information processing devices, and to update the first individual setting information for each user stored in the setting information unit to latest individual setting information for the corresponding user based on a result of the comparison, wherein the synchronization control unit is further configured to acquire common update information that is common to the plural information processing devices, wherein the common update information is stored in the synchronization-use common storage unit included in the other one of the plural information processing devices.

According to one embodiment of the present invention, a network synchronization system and an information processing device are provided, with which setting information can be effectively synchronized among plural information processing devices.

BRIEF DESCRIPTION OF THE DRAWINGS

Other objects, features and advantages of the present invention will become more apparent from the following detailed description when read in conjunction with the accompanying drawings, in which:

FIG. 3 illustrates an example (part 1) of setting information that is the target of network synchronization;

FIG. 4A through 4D illustrate an example (part 2) of setting information that is the target of network synchronization;

FIG. 5 is an example of synchronization setting information for network synchronization;

FIG. 7 illustrates an example of setting information of a first MFP and a second MFP before network synchronization;

FIG. 8 illustrates an example of setting information of a first MFP and a second MFP after network synchronization;

FIG. 12 is a flowchart of a detailed example of step S23 in FIG. 11;

FIG. 13 illustrates an example of setting information of a first MFP and a second MFP before network synchronization according to a first modification;

FIG. 14 illustrates an example of setting information of a first MFP and a second MFP after network synchronization according to the first modification;

FIG. 15 illustrates an example of setting information of a first MFP and a second MFP before network synchronization according to a second modification;

FIG. 16 illustrates an example of setting information of a first MFP and a second MFP after network synchronization according to the second modification;

FIG. 18 illustrates an example of synchronization setting information used for network synchronization;

DETAILED DESCRIPTION OF THE PREFERRED EMBODIMENTS

A description is given, with reference to the accompanying drawings, of embodiments of the present invention.

A multifunction peripheral is taken as an example of an information processing device according to an embodiment of the present invention. The multifunction peripheral includes multiple functions such as a copy function, a fax function, a printer function, a scanner function, and a function for distributing an input image (an image obtained by scanning an original with the scanner function or an image input by the printer function or the fax function). However, the present invention is not limited to a multifunction peripheral. The present invention is applicable to any other typical computer device.

First Embodiment

A description is given of a first embodiment according to the present invention with reference to FIGS. 1 through 11.

(Example of System Configuration)

Figure 1:
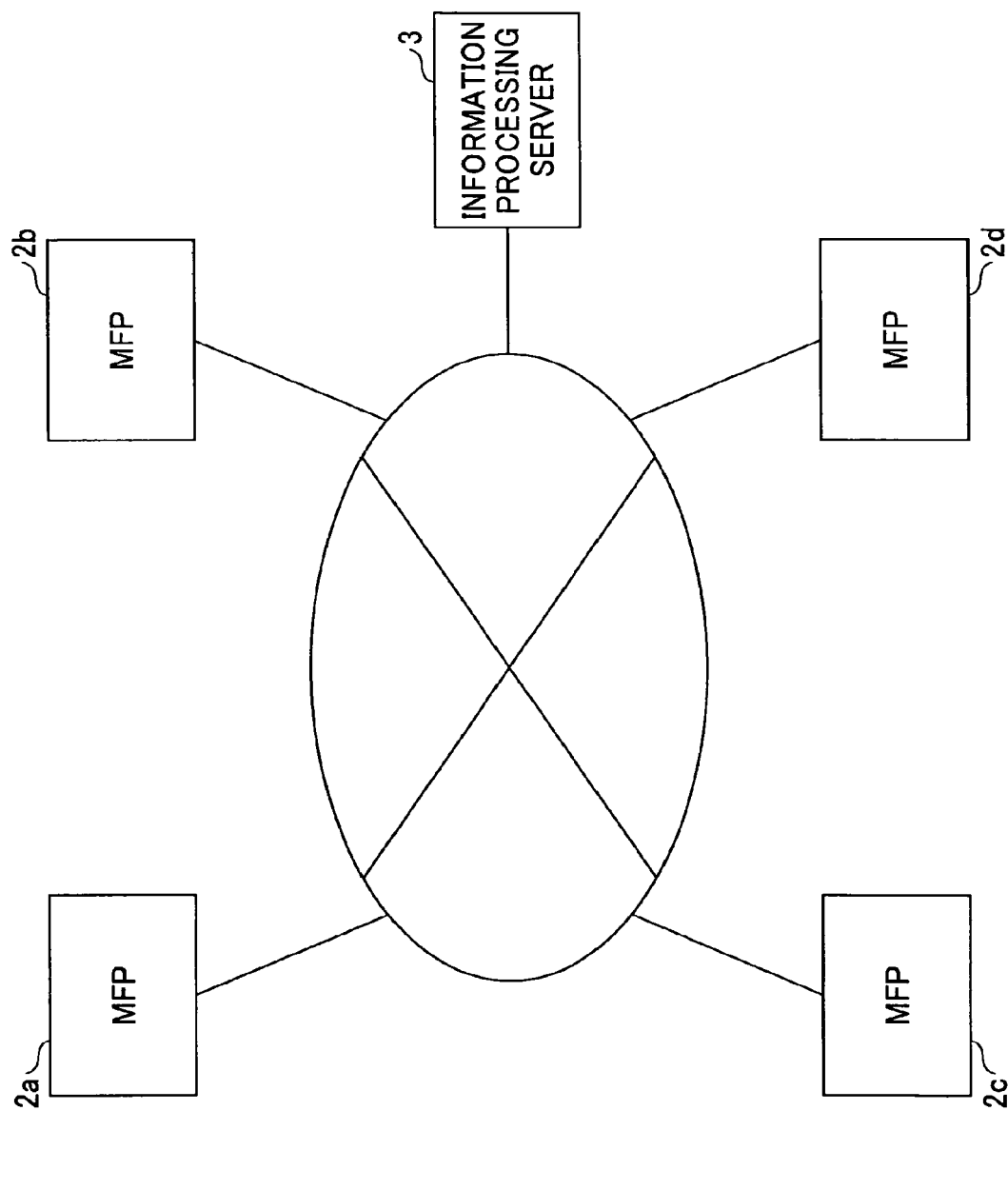
FIG. 1 illustrates a configuration of a network synchronization system according to a first embodiment of the present invention.

FIG. 1 illustrates a configuration of a network synchronization system according to the first embodiment of the present invention. As shown in FIG. 1, a network synchronization system 1 includes plural multifunction peripherals (MFPs) 2a, 2b, 2c, and 2d (hereinafter, simply referred to as "MFP 2" when indicating one of these MFPs) which are interconnected via a network such as LAN (Local Area Network), and an information processing server 3.

As described above, the MFP 2 is an image processing device including multiple functions such as a copy function, a fax function, a printer function, a scanner function, and a function for distributing an input image (an image obtained by scanning an original with the scanner function or an image input by the printer function or the fax function).

The information processing server 3 is a computer device, which functions as a user information management server for managing, in an integrated manner, user information including user names and passwords of the users using the network synchronization system 1, and which acquires various information items such as antivirus definition information from an external device (not shown). Plural information processing servers can be provided according to the usage purpose.

With the above system configuration, in the network synchronization system 1 according to the first embodiment, setting information in the plural MFPs 2 can be effectively synchronized (hereinafter, synchronization according to an embodiment of the present invention is referred to as "network synchronization").

(Example of Functional Configuration of Network Synchronization of Setting Information)

Figure 2:
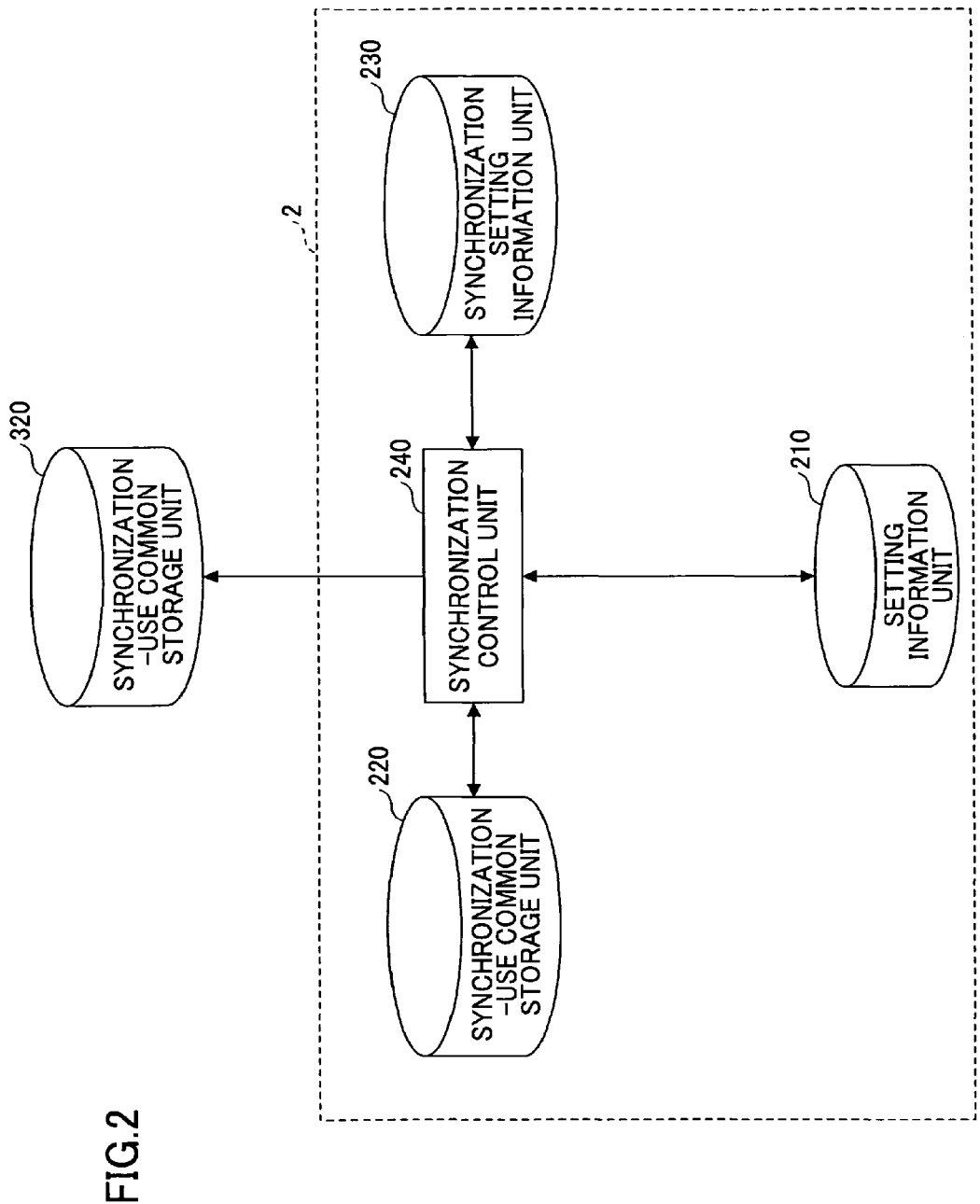
FIG. 2 is a functional block diagram of a multifunction peripheral (MFP) according to the first embodiment of the present invention.

FIG. 2 is a functional block diagram illustrating the network synchronization of the setting information of the MFP. As shown in FIG. 2, the MFP 2 includes a setting information unit 210, a synchronization-use common storage unit 220, synchronization setting information unit 230, and a synchronization control unit 240.

The setting information unit 210 is a storage device in the MFP 2 for storing setting information. The setting information (individual setting information) is specified for each user registered as being authorized to use the corresponding MFP 2, although the present invention is not so limited. Specific examples are given below with reference to FIGS. 3 and 4.

The synchronization-use common storage unit 220 is a storage device for storing setting information that is the target of network synchronization in the network synchronization system 1. The setting information that is the target of network synchronization is, for example, the setting information stored in the setting information unit 210. The information stored in the setting information unit 210 is copied into the synchronization-use common storage unit 220. When the synchronization setting information unit 230 described below has made a setting of "disclose" in the item for specifying whether to "disclose synchronization-use common folder (synonymous to synchronization-use common storage unit)", the user can access the synchronization-use common storage unit 220 of a certain MFP 2 from another MFP 2. That is, when a setting of "disclose" is set in the item for specifying whether to "disclose synchronization-use common folder" in a second MFP 2 that is provided with a synchronization-use common storage unit 320, a first MFP 2 can access the synchronization-use common storage unit 320 of the second MFP 2 to acquire the setting information of the second MFP 2.

The synchronization setting information unit 230 is a storage device for storing synchronization setting information which specifies operations of network synchronization. An example of the synchronization setting information is described below with reference to FIG. 5.

The synchronization control unit 240 implements various control operations pertaining to network synchronization based on synchronization setting information stored in the synchronization setting information unit 230. A CPU (Central Processing Unit) implements the control operations based on a program (synchronization control program) installed in the MFP 2.

With the above functional configuration, the network synchronization system 1 according to the first embodiment can effectively perform network synchronization for the setting information in the plural MFPs 2 (particularly, the setting information of each of the users registered in the respective devices). Furthermore, when the setting information of the same user is separately managed in different MFPs 2, the separately managed information items can be associated with each other (tied together), and can be the appropriately synchronized.

Each of the setting information unit 210, the synchronization-use common storage unit 220, and the synchronization setting information unit 230 may be constituted with two HDD sections having exactly the same format for storing setting information. One of the HDD sections may correspond to a storage unit for storing the setting information that is currently being operated, and the other one of the HDD sections may correspond to a storage unit for storing the setting information obtained after the network synchronization. Each time the network synchronization is completed, the currently-operated HDD section may be switched. Accordingly, the network synchronization results may be immediately reflected.

(Example of Setting Information that is Target of Network Synchronization)

FIGS. 3 and 4A through 4D illustrate examples (part 1) and (part 2) of the setting information that is the target of network synchronization. This setting information is stored in the setting information unit 210, and is copied into the synchronization-use common storage unit 220. The setting information may include individual (user) setting information as shown in FIG. 3, or registered user information, deleted user information, same-user information, and user authentication information as shown in FIGS. 4A through 4D.

The individual setting information as shown in FIG. 3 is provided for each user registered in the MFP 2, and therefore the number of sets of individual setting information is equal to the number of users (usually plural). Each of the sets of information shown in FIGS. 4A through 4D (the registered user information through the user authentication information) corresponds to catalog information displaying a collective list of plural users.

First, a description is given of the "individual setting information" shown in FIG. 3. The "individual setting information" is a table for managing setting information for each user registered as being authorized to use the corresponding device (self-device, i.e., self-MFP) or another device. A user registered in another device is included because such a user will also be registered in the corresponding device as a result of the network synchronization according to an embodiment of the present invention.

The "user ID (unique)" is user identification information for identifying the user in the self-device. For example, a unique user ID is determined internally based on a combination of time information expressing the time when the user first registered in the self-device and machine-specific information of the self-device (for example, network address (MAC address)).

The "furigana" is the hiragana corresponding to the kanji expressing the user's name (in Japanese characters). "Division" is the name of the division to which the user belongs. The "individual name (unique)" is the unique individual name of the user. This information is managed by the information processing server 3.

The "user name (unique)" and the "password" are used by the user to log into the self-device. The password is information that is to be periodically renewed in consideration of safety, and is thus not unique in this example.

The "IC card number (unique)" is used as authentication reference information held by the self-device for performing authentication based on an IC card when the user can log into the self-device with the use of an IC card.

The "Windows (registered trademark) user name" and the "Windows (registered trademark) user password" are authentication information used when authentication is performed for the user to enter the information processing server 3 (in this case, a Windows (registered trademark) server), i.e., an external server, to log into the self-device.

Next, a description is given of the "registered user information" shown in FIG. 4A. The "registered user information" is a table for managing information corresponding to the preference of each user that is currently registered in the self-device (or another device). As described above, this information corresponds to catalog information displaying a collective list of plural users.

The "user ID" corresponds to the user ID of FIG. 3. The "user name" corresponds to the user name (unique) of FIG. 3.

The "individual name" corresponds to the individual name (unique) of FIG. 3. The "last login date (important)" is the date of the last time the user logged into the self-device. This information is automatically set in the self-device when the user logged in the last time. The "last-update date (important)" is the date of the last time the user's individual setting information was updated in the self-device. This information is automatically set in the self-device at the last time the information was updated. The "IC card number" corresponds to the IC card number of FIG. 3. The "individual setting file" corresponds to the file including the individual setting information regarding the user shown in FIG. 3. The "individual setting file" is exchanged between the self-device and other devices; the data of the individual setting information in the file can be compressed to facilitate the process of exchanging this information.

The information corresponding to the preference of each user managed in the "registered user information" is not limited to that shown in FIG. 4A. For example, the information may include various contents such as a file of a document that the user stored in the self-device or a QR cover sheet obtained by embedding the user ID into a QR code.

The "registered user information" is appropriately updated by performing network synchronization according to an embodiment of the present invention. In addition to the "registered user information" that is updated to the latest version, the setting information unit 210 preferably stores plural versions of the "registered user information", including the version corresponding to the previous update (and the "registered user information" corresponding to the update before the previous update). This is to be prepared for recovery in the event that an unpredicted error occurs.

Next, a description is given of the "deleted user information" shown in FIG. 4B. The "deleted user information" is a table functioning as a managing unit for managing deleted users. As described above, this information corresponds to catalog information displaying a collective list of plural users.

The "user ID" corresponds to the user ID (unique) shown in FIG. 3. The "deleted date (important)" is information specifying the date when the user was deleted. This information is automatically set when the user is deleted.

Next, a description is given of the "same-user information" shown in FIG. 4C. The "same-user information" is a table functioning as an associating unit for associating setting information of the same user managed separately in the respective devices.

The "GUID" is unique identification information in the self-device (or another device). For example, a unique "GUID" is determined internally based on a combination of time information and machine-specific information of the self-device (for example, network address (MAC address)). This is linking information for associating user IDs that are separately registered in different devices. The "user ID" corresponds to the user ID shown in FIG. 3.

For example, a user having a user name "TARO" may be given a user ID of "01a" in one device and may be given a user ID of "01b" in another device. Even when this is the case, by issuing a GUID of "A01", which is common to both of these user IDs as shown in FIG. 4C, it can be determined that the user who is given the user ID of "01b" and the user who is given the user ID of "01a" correspond to the same user. Accordingly, by providing "same-user information", user IDs of the same user managed separately in different devices can be associated with each other.

Next, a description is given of the "user authentication information" shown in FIG. 4D. The "user authentication information" is a table functioning as a managing unit for managing, in a simple manner, the setting information of each user whose user IDs are associated together in the "same-user information" table shown in FIG. 4C. The "user authentication information" is created based on the same user list shown in FIG. 4C.

The "user ID" corresponds to the user ID shown in FIG. 3 in the self-device. The "remote user ID" corresponds to the user ID shown in FIG. 3 of the same user registered in another device.

For example, when the user with the user ID "01b" attempts to log into a device, but cannot use the user ID "01b" to log into the device, the device can refer to the "same-user information" table and finds out that a GUID "A01" is assigned to the user ID "01b", and the GUID "A01" is also assigned to the user ID "01a". Accordingly, the user with the user ID "01b" can log into the device as the user with the user ID "01a".

Meanwhile, in the "user authentication information" table, the "user ID" which is the user ID in the self-device and the "remote user ID" which is the user ID in another device, are associated with each other one-on-one. Accordingly, the device can find out that the user ID "01a" and the user ID "01b" are associated with each other, without referring to the GUID.

(Example of Synchronization Setting Information for Network Synchronization)

FIG. 5 is an example of synchronization setting information for network synchronization. The synchronization setting information is stored in the synchronization setting information unit 230. The synchronization setting information is system setting information unique to each of the devices, and specifies settings for the network synchronization according to an embodiment of the present invention.

Based on such synchronization setting information, the synchronization control unit 240 implements various control operations pertaining to network synchronization. In the following, descriptions are given of each of the setting items shown in FIG. 5, in association with the control operations performed by the synchronization control unit 240 shown in FIG. 2.

First, a description is given of the "last-update date setting". The "last-update date setting" is internally set when the setting information held in the self-device is updated.

The "last update time/date" is a setting item specifying the time/date of updating the setting information held in the self-device the last (most recent) time due to network synchronization. This setting item is internally set when the self-device performs network synchronization. In order to perform the network synchronization, the synchronization control unit 240 compares the last update time/date of the self-device with that of another device, and when the last update time/date of the other device is newer than that of the self-device, the synchronization control unit 240 updates the setting information of the self-device so as to correspond to that of the other device. Accordingly, the self-device can always hold the latest setting information. For example, when the network synchronization system 1 has three devices, including a device A (last update time/date 10 o'clock), a device B (last update time/date 11 o'clock), and a device C (last update time/date 12 o'clock), the setting information of the devices A and B is updated so that all of the devices hold the setting information of the device C (last update time/date 12 o'clock).

Next, a description is given of "network synchronization setting". The "network synchronization setting" specifies whether the self-device is to perform network synchronization, and also specifies the synchronization intervals at which the self-device is to perform network synchronization.

"(Perform or do not perform) network synchronization" is a setting item specifying whether the self-device is to perform "network synchronization". When "perform (network synchronization)" is set, the synchronization control unit 240 can perform network synchronization.

"Disclose (or do not disclose) synchronization-use common folder (synonymous to synchronization-use common storage unit 220)" is a setting item specifying whether to disclose or to not disclose the synchronization-use common folder of the self-device to the outside. When "disclose" is specified, devices other than the self-device can access the synchronization-use common folder of the self-device. That is, in another device provided with the synchronization-use common storage unit 320, when "disclose" is set in the item of "disclose synchronization-use common folder", the synchronization control unit 240 (of the self-device) can access the synchronization-use common storage unit 320 (of the other device). In the present embodiment, "disclose" is set only for a single one of the MFPs 2 in the network synchronization system 1.

The "network path (for example, displaying 1 through 1,024 characters)" is a setting item for specifying the location of the synchronization-use common folder of another device. With the use of this network path, the synchronization control unit 240 can identify the location of a synchronization-use common folder (for example, the synchronization-use common storage unit 320) of another device. The self-device can have the following configuration. That is, when "disclose" is set as the setting item of "disclose synchronization-use common folder" in the self-device, the setting of the network path is made ineffective. This is because when the synchronization-use common folder of the self-device is disclosed to other devices, and there is no need to set such a network path. Conversely, the setting of the network path is made effective when "do not disclose" is set in the self-device.

"Login user name (for example, displaying 0 through 256 English one byte characters)" and "login password (for example, displaying 0 through 256 characters)" are setting items for the login user name and the login password, respectively, which are used for logging into the synchronization-use common folder of the self-device. By using the "login user name" and the "login password" of another device, the synchronization control unit 240 can connect to the synchronization-use common folder (for example, the synchronization-use common storage unit 320) of the other device.

"Automatic synchronization interval (for example, 10 through 9,999 minutes)" is a setting item for specifying synchronization intervals at which the self-device is to perform network synchronization with another device. The synchronization control unit 240 performs network synchronization between the self-device and another device at automatic synchronization intervals as specified. The automatic synchronization intervals can be specified by the user. Furthermore, in order to distribute the network load, the probability according to random numbers can be calculated based on the machine-specific number and the present time, to determine the next synchronization time from a synchronization interval probability X.

The synchronization setting information shown in FIG. 5 is described above. The synchronization setting information is setting information specific to each of the devices. Based on such synchronization setting information, the synchronization control unit 240 implements various control operations pertaining to network synchronization. In the following, a description is given of the control operations.

(Example of Network Synchronization Operations)

Figure 6:
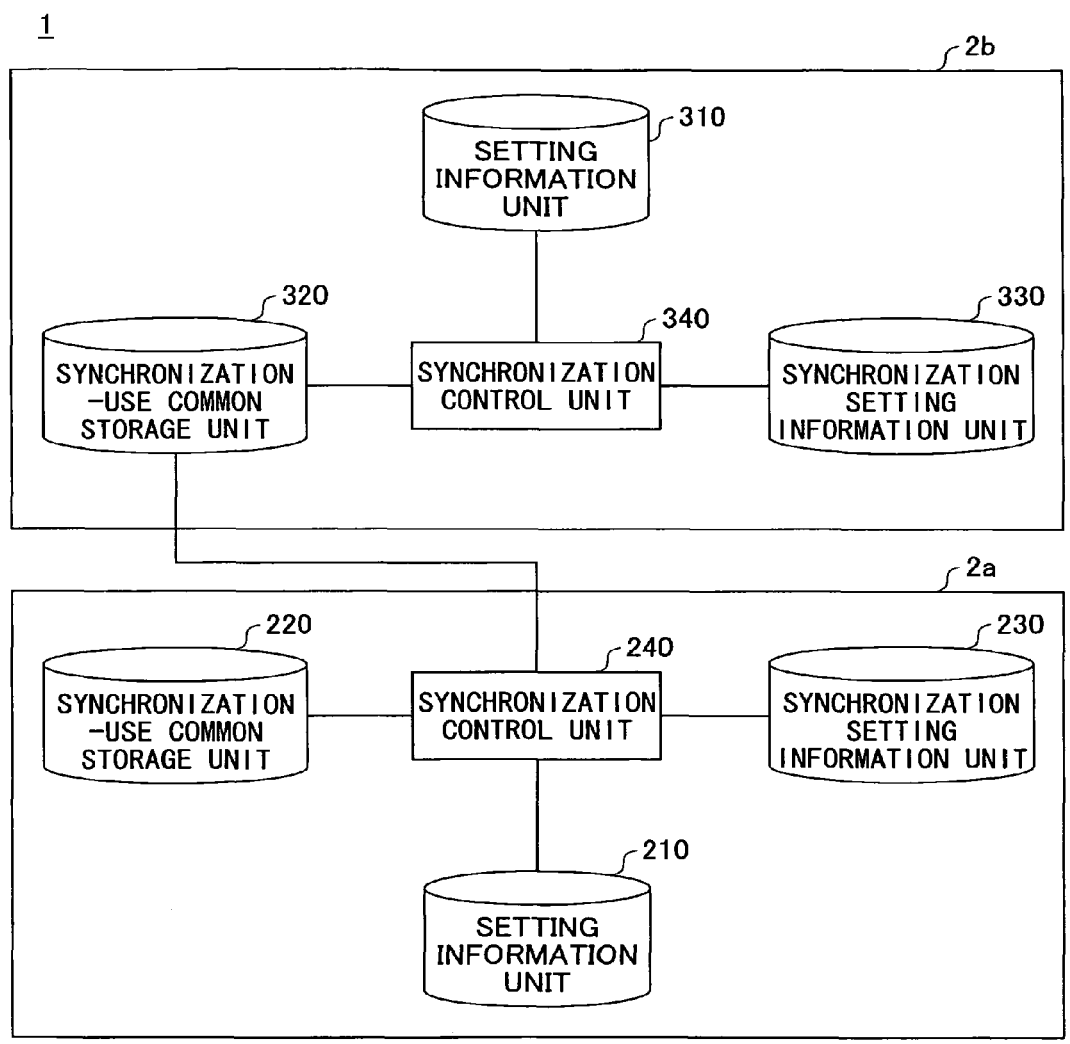
FIG. 6 illustrates an example of a system configuration for describing a network synchronization operation.

FIG. 6 illustrates an example of a system configuration for describing the network synchronization operation. A description is given of an example of network synchronization operations for synchronizing the setting information, performed between the MFP 2a (second device) (corresponding to self-device) that has newly joined the network synchronization system 1, and the MFP 2b (first device) that is different from the self-device. It is assumed that the setting information schematically illustrated in FIG. 7 is stored beforehand in the setting information unit 210 and a setting information unit 310 of the MFP 2a and the MFP 2b, respectively. As shown in FIG. 7, the user "TARO" is given different user IDs "01a" and "01b" in the MFP 2a and the MFP 2b, respectively.

When the network synchronization operation ends, the setting information shown in FIG. 7 changes to that shown in FIG. 8. By comparing FIGS. 7 and 8, it can be found that in FIG. 8, the user ID "01a" and the user ID "01b" have been associated with each other in the same-user information table of the MFP 2b. Furthermore, as shown in FIG. 8, in the MFP 2a, the individual setting file of the user ID "01a" has been updated from "File01a" to "File01b", and a new user having a user ID "02b" has been added. In the user authentication information table, the user ID "01a" and the user ID "01b" have been associated with each other.

In the present embodiment, the network synchronization operation is described in the order of a first operation and a second operation. The first operation is for performing synchronization of the setting information between the setting information unit 310 and the synchronization-use common storage unit 320 in the MFP 2b. The second operation is for performing synchronization between the MFP 2a that has newly joined the network synchronization system 1 and the MFP 2b (synchronization-use common storage unit 320). It is assumed that in the MFP 2b, the setting item of "disclose synchronization-use common folder" is set as "disclose". Accordingly, the MFP 2a can access the synchronization-use common storage unit 320 of the MFP 2b.

(Network Synchronization Operation (First Operation))

Figure 9:
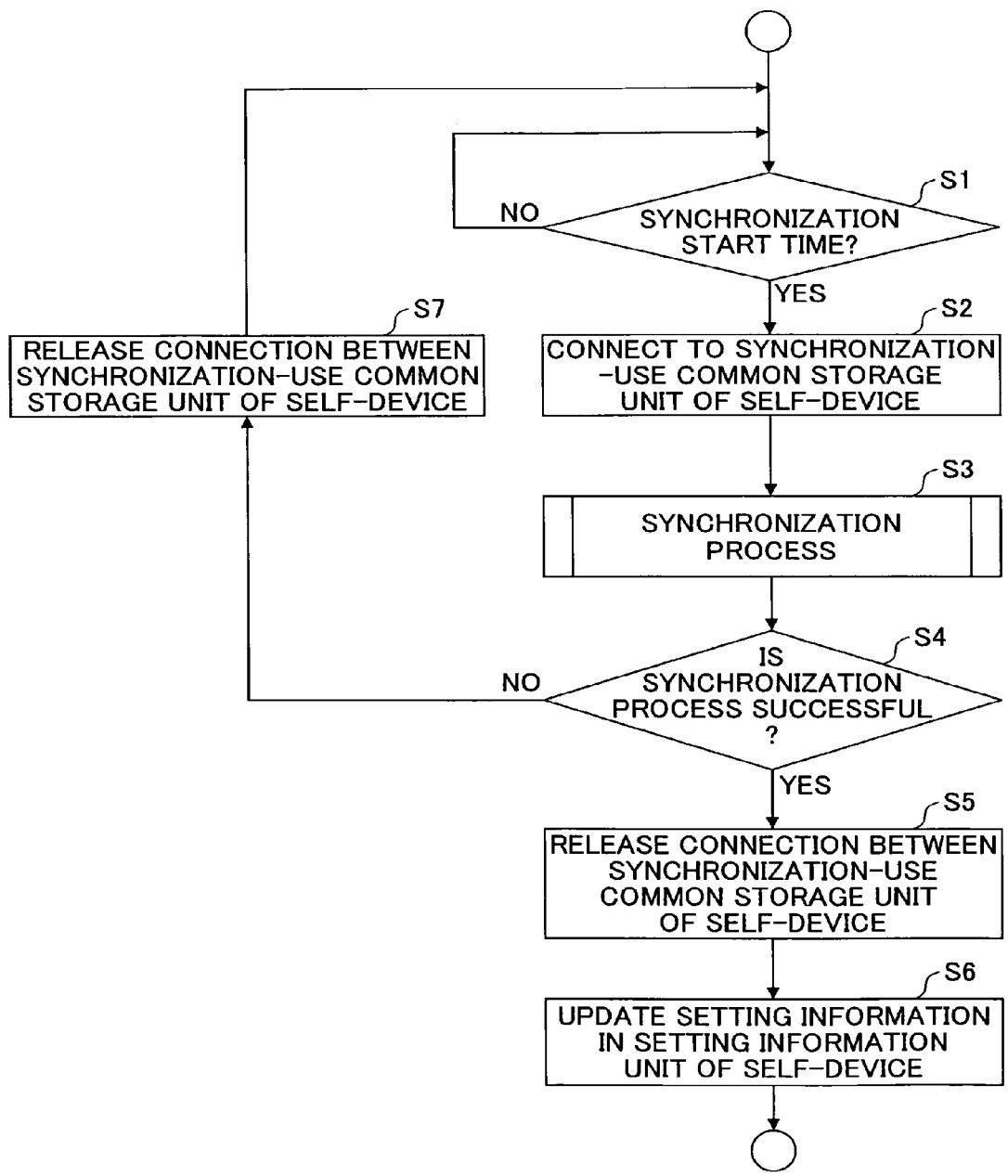
FIG. 9 is a flowchart of an example of a first operation of a network synchronization operation.
Figure 10:
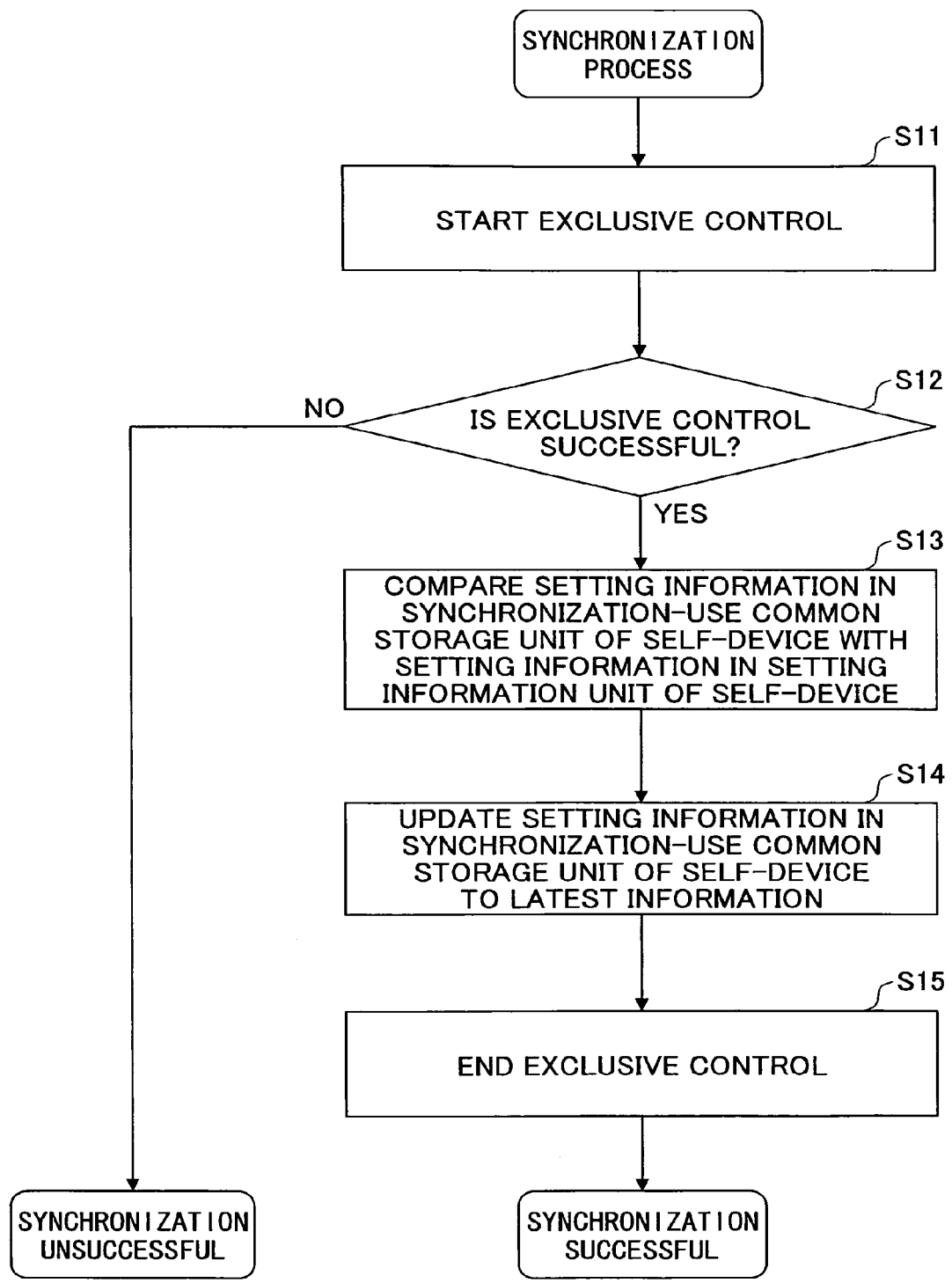
FIG. 10 is a flowchart of a detailed example of step S3 in FIG. 9.

First, a description is given of the first operation. FIG. 9 is a flowchart of an example of the first operation of the network synchronization operation. FIG. 10 is a flowchart of a detailed example of step S3 in FIG. 9. A description is given of an example of a first operation, in which synchronization of setting information is performed between the setting information unit 310 and the synchronization-use common storage unit 320 in the MFP 2b.

First, the MFP 2b determines whether the time has reached the synchronization start time (step S1). At this step, a synchronization control unit 340 makes the determination based on a setting of "automatic synchronization interval" which is stored in a synchronization setting information unit 330. When it is determined the time has reached the synchronization start time (Yes in step S1), the flow proceeds to step S2. When it is determined that the time has not yet reached the synchronization start time (No in step S1), step S1 is repeatedly performed.

In step S2, the MFP 2b connects itself to the synchronization-use common storage unit 320 of the self-device (step S2). In this case, it means that in the MFP 2b, the synchronization control unit 340 is connected to the synchronization-use common storage unit 320.

In step S3, the MFP 2b performs a synchronization process between its synchronization-use common storage unit 320 (step S3). In this case, it means that in the MFP 2b, the setting information stored in the synchronization-use common storage unit 320 is updated based on the setting information stored in the setting information unit 310.

Details of the process performed at step S3 are described with reference to FIG. 10.

First, the MFP 2b starts exclusive control (step S11). The synchronization control unit 340 creates a directory, for example, as a process of exclusive control. Specifically, before starting synchronization, the synchronization control unit 340 creates a directory in the synchronization-use common storage unit 320 of the self-device. Only a device that has succeeded in creating a directory is allowed to use the synchronization-use common storage unit 320.

In step S12, the MFP 2b determines whether the exclusive control is successfully implemented (step S12). When the exclusive control is successfully implemented (Yes in step S12), the flow proceeds to step S13. When the exclusive control is unsuccessful (No in step S12), it means that the synchronization is unsuccessful, and the process ends as "synchronization unsuccessful".

In step S13, the MFP 2b compares the setting information in the synchronization-use common storage unit 320 of the self-device with the setting information in the setting information unit 310 of the self-device (step S13). In this example, the synchronization-use common storage unit 320 does not store any setting information, and the flow proceeds to step S14, where the MFP 2b updates the setting information in the synchronization-use common storage unit 320 of the self-device to the latest information (step S14). In this step, the setting information stored in the setting information unit 310 is copied to the synchronization-use common storage unit 320 of the self-device to update/convert the synchronization-use common storage unit 320.

When step S14 is completed, the flow proceeds to step S15, where the MFP 2b ends the exclusive control that has started in step S11 (step S15). The exclusive control ends as the synchronization control unit 340 erases the directory created at step S11. As the synchronization is successful, the process ends as "synchronization successful".

Referring back to FIG. 9, when the synchronization process at step S3 is completed, the flow proceeds to step S4, where the MFP 2b determines whether the synchronization process is successful (step S4). When the synchronization process is successful (Yes in step S4), the flow proceeds to step S5. When the synchronization process is unsuccessful (No in step S4), the flow proceeds to step S7.

In step S5, the MFP 2b releases the connection between the synchronization-use common storage unit 320 of the self-device, which has started at step S2 (step S5). In this case, it means that in the MFP 2b, the synchronization control unit 340 is disconnected from the synchronization-use common storage unit 320.

Next, in step S6, the MFP 2b updates the setting information in the setting information unit 310 of the self-device (step S6). The synchronization control unit 340 updates the setting information of the setting information unit 310 based on the setting information in the synchronization-use common storage unit 320 that has been updated to the latest information. In this example, there is initially nothing stored in the synchronization-use common storage unit 320, and therefore the setting information in the setting information unit 310 and the synchronization-use common storage unit 320 is the same. Accordingly, step S6 can be skipped.

In step S6, in a case where the setting information unit 310 includes HDD sections having exactly the same format for storing the setting information, the synchronization results can be immediately reflected by switching the HDD section that is currently operating. The HDD section is preferably switched when all of the users using the MFP 2b have logged out. When the process of step S6 is completed, the flow returns to step S1 once again.

In step S7, the MFP 2b releases the connection between the synchronization-use common storage unit 320 of the self-device, which has started at step S2 (step S7), and the flow returns to step S1.

By performing the above process, the MFP 2b executes the first operation of performing synchronization of the setting information between the setting information unit 310 and the synchronization-use common storage unit 320. Accordingly, the setting information shown in the upper stage of FIG. 7 is stored in the synchronization-use common storage unit 320.

(Network Synchronization Operation (Second Operation))

Figure 11:
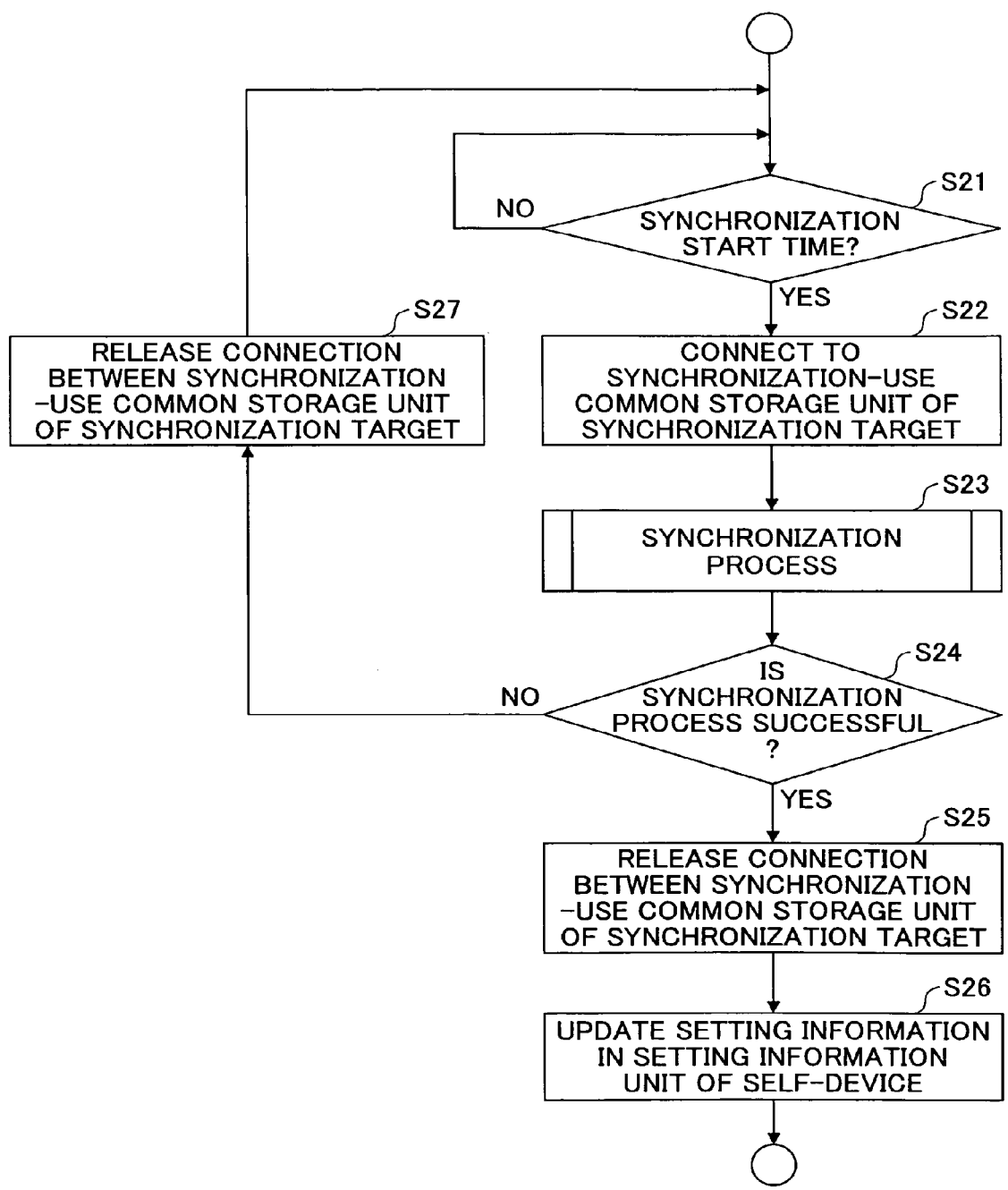
FIG. 11 is a flowchart of an example of a second operation of the network synchronization operation.

Next, a description is given of an example of the second operation. It is assumed that the setting information shown in the upper stage of FIG. 7 is stored in the synchronization-use common storage unit 320 as a result of the first operation. FIG. 11 is a flowchart of an example of the second operation of the network synchronization operation. FIG. 12 is a flowchart of a detailed example of step S23 in FIG. 11.

First, the MFP 2a determines whether the time has reached the synchronization start time (step S21). At this step, the synchronization control unit 240 makes the determination based on a setting of "automatic synchronization interval" which is stored in the synchronization setting information unit 230. When it is determined the time has reached the synchronization start time (Yes in step S21), the flow proceeds to step S22. When it is determined that the time has not yet reached the synchronization start time (No in step S21), step S21 is repeatedly performed.

In step S22, the MFP 2a connects itself to the synchronization-use common storage unit 320 of the MFP 2b, with which synchronization is to be performed (synchronization target) (step S22). In this case, the synchronization control unit 240 of the MFP 2a is connected to the synchronization-use common storage unit 320 of the MFP 2b.

In step S23, the MFP 2a performs a synchronization process with the MFP 2b, which is the synchronization target (step S23). In this case, it means that the setting information stored in the synchronization-use common storage unit 320 of the MFP 2b is updated. Details of the process performed at step S23 are described with reference to FIG. 12.

First, the MFP 2a starts exclusive control (step S31). The synchronization control unit 240 creates a directory, for example, as a process of exclusive control. Specifically, before starting synchronization, the synchronization control unit 240 of the MFP 2a creates a directory in the synchronization-use common storage unit 320 of the MFP 2b, which is the synchronization target. Only a device that has succeeded in creating a directory is allowed to use the synchronization-use common storage unit 320 of the MFP 2b.

In step S32, the MFP 2a determines whether the exclusive control is successfully implemented (step S32). When the exclusive control is successfully implemented (Yes in step S32), the flow proceeds to step S33. When the exclusive control is unsuccessful (No in step S32), it means that the synchronization is unsuccessful, and the process ends as "synchronization unsuccessful".

In step S33, the MFP 2a compares the setting information in the synchronization-use common storage unit 320 of the MFP 2b, which is the synchronization target (see upper stage of FIG. 7), with the setting information in the setting information unit 210 of the self-device (see lower stage of FIG. 7) (step S33).

In step S33, the synchronization control unit 240 associates different user IDs of the same users together, among the users of the registered user information in the setting information unit 210 and the users of the registered user information in the synchronization-use common storage unit 320. For example, the user having the user ID of "01a" shown in the lower stage of FIG. 7 and the user having the user ID of "01b" shown in the upper stage of FIG. 7 have the same user name "TARO". As described above, when the same user name is registered in different devices with different user IDs, it is determined that the different user IDs correspond to the same user, and the different user IDs are associated with each other. When different setting information items are determined as being relative to the same user, the different setting information items are associated with each other in the same-user information table.

In step S34, the MFP 2a updates the setting information in the synchronization-use common storage unit 320 of the synchronization target and the setting information unit 210 of the self-device, to the latest information (step S34). In this step, after the comparison made at step S33, the synchronization control unit 240 updates/converts the setting information stored in the synchronization-use common storage unit 320 and the setting information stored in the setting information unit 210 of the self-device, to the latest information.

In step S34, the MFP 2a is a device that has newly joined the network synchronization system 1, and therefore, all setting information held in the MFP 2a is determined as being old, and the individual setting file of each of the users is updated based on the setting information stored in the synchronization-use common storage unit 320.

Accordingly, the setting information in the lower stage of FIG. 7 is changed to the setting information in the lower stage of FIG. 8. The registered user information table shown in the lower stage of FIG. 8 indicates that all of the individual setting files have been updated. Furthermore, the setting information in the upper stage of FIG. 7 is updated to the setting information in the upper stage of FIG. 8. The same-user information table in the upper stage of FIG. 8 indicates that the setting information items separately managed in the respective devices are associated with each other (tied together).

When step S34 is completed, the flow proceeds to step S35, where the MFP 2a ends the exclusive control that has started in step S31 (step S35). The exclusive control ends as the synchronization control unit 240 erases the directory created at step S31. As the synchronization is successful, the process ends as "synchronization successful".

Referring back to FIG. 11, when the synchronization process at step S23 is completed, the flow proceeds to step S24, where the MFP 2a determines whether the synchronization process is successful (step S24). When the synchronization process is successful (Yes in step S24), the flow proceeds to step S25. When the synchronization process is unsuccessful (No in step S24), the flow proceeds to step S27.

In step S25, the MFP 2a releases the connection between the synchronization-use common storage unit 320 of the synchronization target, which has started at step S22 (step S25). In this case, it means that the synchronization control unit 240 is disconnected from the synchronization-use common storage unit 320.

Next, in step S26, the MFP 2a updates the setting information in the setting information unit 210 of the self-device (step S26). In step S26, in a case where the setting information unit 210 includes HDD sections having exactly the same format for storing the setting information, the synchronization results can be immediately reflected by switching the HDD section that is currently operating. The HDD section is preferably switched when all of the users using the MFP 2a have logged out. When the process of step S26 is completed, the flow returns to step S21-once again.

In step S27, the MFP 2a releases the connection between the synchronization-use common storage unit 320 of the synchronization target, which has started at step S22 (step S27), and the flow returns to step S21.

By performing the above process, the MFP 2a that has newly joined the network synchronization system 1 executes the second operation of performing synchronization between the MFP 2b (synchronization-use common storage unit 320). Accordingly, the setting information shown in the lower stage of FIG. 8 is stored in the setting information unit 210.

In the network synchronization system 1 and the MFP 2 according to the first embodiment of the present invention, synchronization can be performed between MFPs connected via a network, without the use of a server device. This is possible because each of the MFPs 2 constantly maintains the latest setting information in the synchronization-use common folder disclosed in the network. Furthermore, according to the first embodiment, setting information of the same user whose user IDs are separately managed in different MFPs 2 can be associated with each other (tied together), so that synchronization can be performed appropriately.

In the process of step S33, when different user IDs are given to the same user name, it is determined that the different user IDs correspond to the same user; however, the present invention is not so limited. Other kinds of information may be uniquely given to each user, other than a user name. An example of another kind of information is an IC card number, or biometric authentication information that is managed in association with the user. In addition to a user name, the "Windows (registered trademark) user name" and the "Windows (registered trademark) user password" in the individual setting information of the user (see FIG. 3) may also be used. In this case, authentication is performed between the MFP 2 and the information processing server 3 (that is, authentication at the external server), and user information can be associated between the MFP 2 and the information processing server 3 by automatically changing the user name of the user to that managed in the information processing server 3.

(First Modification of Network Synchronization Operation)

A description is given of a first modification of the network synchronization operation. After the network synchronization operation, when the same new user is registered in both the MFP 2a and the MFP 2b, network synchronization for the setting information is performed between the MFPs. It is assumed that setting information schematically shown in FIG. 13 (a user having the user name "SABURO" and a user having the user name "SHIRO") is stored beforehand in the setting information unit 210 and the setting information unit 310 of the MFP 2a and the MFP 2b, respectively.

In this case also, the operation is performed in the order of the first operation described with reference to FIGS. 9 and 10 and the second operation described with reference to FIGS. 11 and 12. A supplemental description is given on steps S33 and S34 in FIG. 12.

In step S33, the MFP 2a compares the setting information (see upper stage of FIG. 13) in the synchronization-use common storage unit 320 of the synchronization target with the setting information (see lower stage of FIG. 13) in the setting information unit 210 of the self-device (step S33).

In step S33, the synchronization control unit 240 associates the same users together, among the users of the registered user information in the setting information unit 210 and the users of the registered user information in the synchronization-use common storage unit 320. For example, the user having the user ID of "03a" shown in the lower stage of FIG. 13 and the user having the user ID of "03b" shown in the upper stage of FIG. 13 have the same user name "SABURO". The user having the user ID of "04a" and the user having the user ID of "04b" have the same user name "SHIRO". When the same user name is registered in different devices with different user IDs, it is determined that the different user IDs correspond to the same user, and the different user IDs are associated with each other. When different setting information items are determined as being relative to the same user, the different setting information items are associated with each other in the same-user information table.

In step S34, the MFP 2a updates the setting information in the synchronization-use common storage unit 320 of the synchronization target and the setting information unit 210 of the self-device, to the latest information (step S34). In this step, the synchronization control unit 240 updates the individual setting files of the users based on the setting information in the synchronization-use common storage unit 320 and the setting information in the setting information unit 210 of the self-device. In this step, the last-update dates for each user are compared with one another, and the individual setting files are updated to the individual setting file having the latest update date. For example, for the user having the user name of "SABURO", the last-update date of the individual setting file in the upper stage of FIG. 13 is newer than that in the lower stage of FIG. 13, and therefore all individual setting files for this user are updated to "File03b". Meanwhile, for the user having the user name of "SHIRO", the last-update date in the lower stage of FIG. 13 is newer than that in the upper stage of FIG. 13, and therefore all individual setting files for this user are updated to "File04a". Accordingly, the setting information in the lower stage of FIG. 13 is changed to the setting information in the lower stage of FIG. 14. Furthermore, the setting information in the upper stage of FIG. 13 is updated to the setting information in the upper stage of FIG. 14. Accordingly, the setting information for each user can be synchronized between both devices.

As described above, according to the first modification, when the same new user is registered in both the MFP 2a and the MFP 2b, network synchronization for the setting information can be efficiently performed between the MFPs with the use of the same-user information table.

(Second Modification of Network Synchronization Operation)

A description is given of a second modification of the network synchronization operation. After the network synchronization operation, when one of the user information items of the same user registered in both the MFP 2a and the MFP 2b has been deleted from either one of the MFP 2a or the MFP 2b, network synchronization for the setting information is performed between the MFPs. It is assumed that setting information shown in FIG. 15 is stored beforehand in the setting information unit 210 and the setting information unit 310 of the MFP 2a and the MFP 2b, respectively (users having the user names "SABURO" and "SHIRO" are deleted from MFP 2b).

In this case also, the operation is performed in the order of the first operation described with reference to FIGS. 9 and 10 and the second operation described with reference to FIGS. 11 and 12. A supplemental description is given on steps S33 and S34 in FIG. 12.

In step S33, the MFP 2a compares the setting information (see upper stage of FIG. 15) in the synchronization-use common storage unit 320 of the synchronization target with the setting information (see lower stage of FIG. 15) in the setting information unit 210 of the self-device (step S33).

In step S33, the synchronization control unit 240 associates the same users together, among the users of the registered user information in the setting information unit 210 and the users of the registered user information in the synchronization-use common storage unit 320. In this case, the setting information items determined as being those of the same user are already associated with each other in the same-user information table in the top stage shown in FIG. 15, and therefore an associating process is not performed.

In step S34, the MFP 2a updates the setting information in the synchronization-use common storage unit 320 of the synchronization target and the setting information unit 210 of the self-device, to the latest information (step S34). In this step, the synchronization control unit 240 updates the individual setting files of the users based on the setting information in the synchronization-use common storage unit 320 and the setting information in the setting information unit 210 of the self-device. A problem arises in how to handle a user having a user name "SABURO", who is deleted from a first device (the MFP 2b in this example), but has logged into a second device (the MFP 2a in this example) after being deleted from the first device. Such a user is determined as capable of using the network synchronization system 1, and is therefore maintained. That is, the last login date and the deletion date in the deleted user information table are compared, and when the last login date is newer than the deletion date, the information is updated such that the user name is maintained. Conversely, when the last login date is older than the deletion date, it is determined that the user is not using the network synchronization system 1 anymore, and therefore the corresponding user name is deleted (in this example, "SHIRO"). Accordingly, the setting information in the lower stage of FIG. 15 is changed to the setting information in the lower stage of FIG. 16. Furthermore, the setting information in the upper stage of FIG. 15 is updated to the setting information in the upper stage of FIG. 16. As shown in the registered user information table in the upper stage of FIG. 16, the user who has logged into one device after being deleted from another device is registered once again in the other device. This user is deleted from the deleted user information table in the upper stage of FIG. 16.

As described above, according to the second modification, when one of the user information items of the same user registered in both the MFP 2a and the MFP 2b has been deleted from either one of the MFP 2a or the MFP 2b, network synchronization for the setting information is effectively performed between the MFPs with the use of the same-user information table and the deleted user information table.

The above describes the first modification and the second modification of the network synchronization operation according to the present embodiment. Other modifications may be made with the use of the registered user information table, the deleted user information table, and the same-user information table. In one modification, when network synchronization is performed between two devices, the user name corresponding to user information items in the registered user information tables of both devices is renamed with "_N". In another modification, among the user information items corresponding to the same user name in the registered user information tables of both devices, the user information corresponding to the newest last-update date is registered in the same-user information table. In yet another modification, among the user information items corresponding to the same individual name in the registered user information tables of both devices, the user's individual name with the oldest last-update date is renamed with "_N". In yet another modification, among the same IC card numbers, the IC card number corresponding to the user with the oldest last-update date is deleted, so that the next time the corresponding user attempts to log in, a deletion notification is made.

For example, it is assumed that a certain user prints out, with the use of a predetermined MFP, a QR cover sheet with a QR code having embedded a user ID of the certain user managed in the predetermined MFP. This QR cover sheet can be used to log into the predetermined MFP. In the same-user information (or authentication user information) shown in FIG. 4 stored in this predetermined MFP, the setting information items of the certain user, which are separately managed in different MFPs (the predetermined MFP and an MFP other than the predetermined MFP), are associated with each other.

With the above configuration, the certain user can print out, with the use of another MFP, a QR cover sheet with a QR code having embedded a user ID of the certain user managed in the other MFP. This QR cover sheet can be used to log into the predetermined MFP.

That is, when a log-in instruction (for logging into a self-device) is made by a user registered in another MFP, this user is allowed to log into the self-device based on individual setting information of the user registered in the self-device that is associated with the same user registered in the other MFP, in the same-user information (or authentication user information) shown in FIG. 4. A reference example is described in a third embodiment given below.

Second Embodiment

A description is given of a second embodiment according to the present invention with reference to FIGS. 17 through 20. The mechanism of network synchronization described in the first embodiment is used to effectively apply, to the devices, update information common to the devices (hereinafter, simply referred to as "common update information") such as definition information for anti-virus measures and update information of functions of the devices.

For example, common update information can be applied to other MFPs, simply by having a certain MFP included in the network synchronization system 1 acquire common update information via a download server on the Internet and transfer it to other MFPs by network synchronization, or by having the common update information applied to a certain MFP and then reflecting (transferring) the settings that are to be applied to be the other MFPs by network synchronization.

(Example of System Configuration)

The network synchronization system according to the second embodiment has the same configuration as that of the network synchronization system 1 according to the first embodiment (see FIG. 1), and is not further described.

(Example of Functional Configuration for Applying Update Information)

Figure 17:
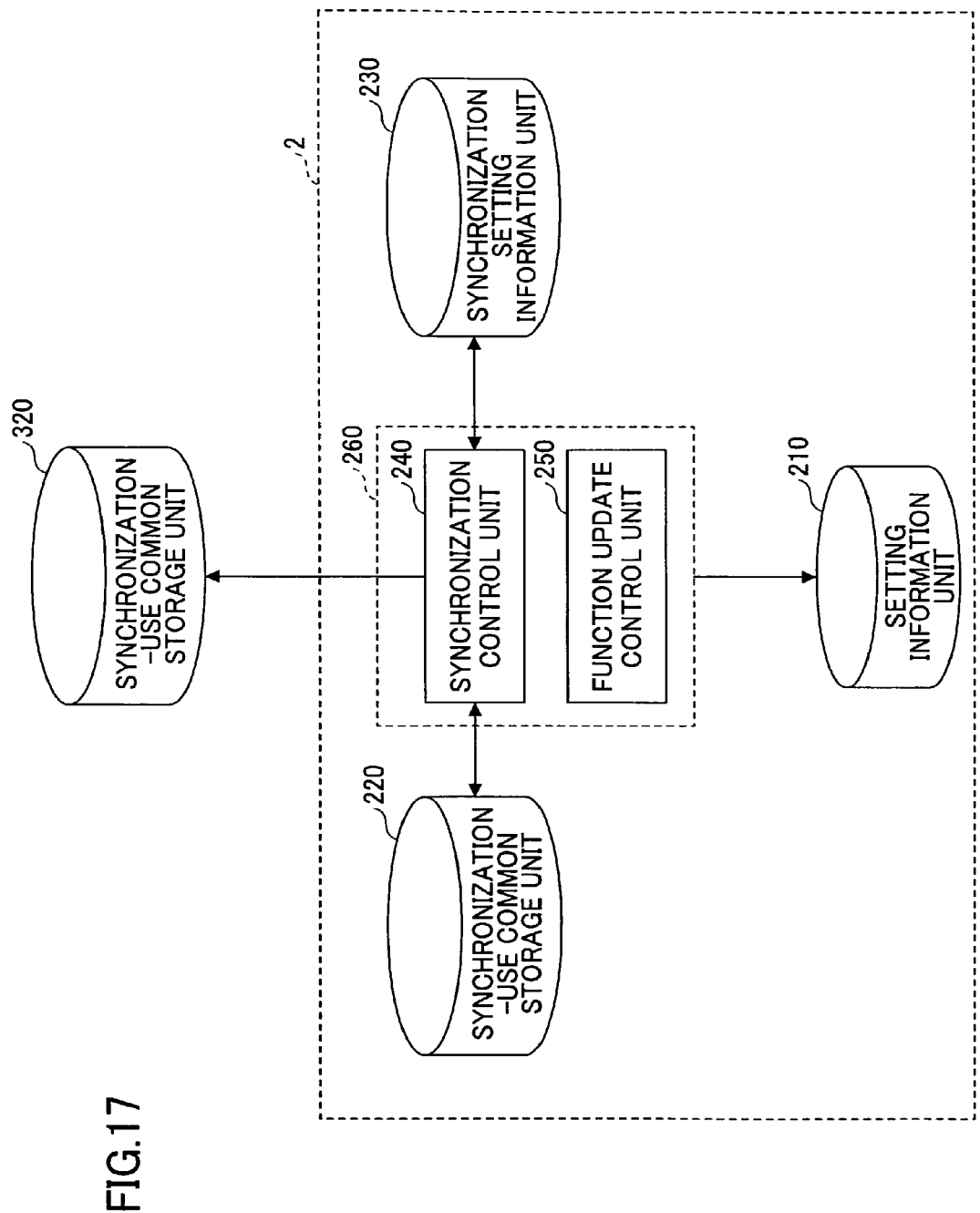
FIG. 17 is a functional block diagram of an MFP according to a second embodiment of the present invention.

FIG. 17 is a functional block diagram of the MFP according to the second embodiment. As shown in FIG. 2, the MFP 2 includes the setting information unit 210, the synchronization-use common storage unit 220, the synchronization setting information unit 230, the synchronization control unit 240, and a function update control unit 250. A description is given of aspects that are different from those of the functional configuration of the MFP according to the first embodiment (see FIG. 2).

The setting information unit 210 stores the setting information of the MFP 2. The setting information includes the above-described common update information in addition to the setting information (individual setting information) for each user described in the first embodiment.

The synchronization-use common storage unit 220 stores the setting information that is the target of network synchronization in the network synchronization system 1. The setting information that is the target of network synchronization is the common update information stored in the setting information unit 210, and this information is copied to and stored in the synchronization-use common storage unit 220.

The synchronization setting information unit 230 stores synchronization setting information which is setting information specifying operations of network synchronization. An example of the synchronization setting information according to the second embodiment is described below with reference to FIG. 18.

The synchronization control unit 240 implements various control operations pertaining to network synchronization based on synchronization setting information stored in the synchronization setting information unit 230.

The function update control unit 250 implements control operations for updating the functions based on synchronization setting information stored in the synchronization setting information unit 230. For example, the function update control unit 250 updates the functions based on the common update information stored in the setting information unit 210 and the synchronization-use common storage unit 220.

With the above functional configuration, the network synchronization system 1 according to the second embodiment can effectively apply, to the devices, common update information such as definition information for anti-virus measures and update information of functions of the devices.

The synchronization control unit 240 and the function update control unit 250 are not clearly distinguished. They may be collectively referred to as a control unit 260, as they are both function units for controlling operations pertaining to network synchronization. In this embodiment, the synchronization control unit 240 and the function update control unit 250 are described separately, but other embodiments of the present invention may have modified designs.

(Example of Synchronization Setting Information Used for Network Synchronization)

FIG. 18 illustrates an example of synchronization setting information used for network synchronization. This synchronization setting information is stored in the synchronization setting information unit 230. Based on such synchronization setting information, the synchronization control unit 240 or the function update control unit 250 implements various control operations for performing network synchronization or for updating functions. In the following, each setting item is described in association with control operations performed by the synchronization control unit 240 or the function update control unit 250.

The "last-update date setting" and the "network synchronization setting" are the same as those in the first embodiment (see FIG. 5), and are not further described.

A description is given of the "settings pertaining to update information". The "settings pertaining to update information" specify, for example, whether to automatically download (transfer) common update information in the self-device, or whether to automatically perform an update operation (apply common update information) based on the common update information.

"(Perform or do not perform) automatic download" is a setting item specifying whether to automatically download common update information in the self-device. Based on this setting item, the synchronization control unit 240 may prevent the common update information stored in a synchronization-use common folder (for example, the synchronization-use common storage unit 320) of another device from being automatically downloaded, or from being downloaded at all.

The "download method (via download server or via network synchronization)" is a setting item for specifying whether the common update information is to be downloaded to the self-device via a download server or via network synchronization. When this setting item is specifying "via network synchronization", the synchronization control unit 240 downloads the common update information stored in a synchronization-use common folder (for example, the synchronization-use common storage unit 320) of another device. When this setting item is specifying "via a download server", the synchronization control unit 240 downloads the common update information from the Internet or from the information processing server 3 if the information processing server 3 is the download server. Accordingly, this is a selection unit which makes it possible to select whether the information is to be downloaded via network synchronization or via a download server.

When "via a download server" is specified for this setting item in a first device, the first device can be configured such that "disclose" is automatically set as the setting item of "disclose synchronization-use common folder". In this case, in other devices, "via network synchronization" is specified ("via a download server" is prevented from being specified). Accordingly, all of the other devices can acquire the common update information from the synchronization-use common folder disclosed by the first device. That is, the common update information acquired via a download server such as the Internet by the first device included in the network synchronization system 1 can be transferred to the other devices by network synchronization. Accordingly, the workload on the network can be reduced between the network synchronization system 1 and external devices.

The "automatic execution interval (for example, 24 through 999 hours)" is a setting item for specifying the execution intervals of automatically downloading the common update information in the self-device. The synchronization control unit 240 automatically downloads the common update information at the specified automatic execution intervals. The automatic execution interval can be specified by the user. The automatic execution interval can also be specified by calculating the probability according to random numbers based on the machine-specific number and the present time for distributing the network load, and determining the next execution time from an execution interval probability X.

"(Perform or do not perform) automatic update" is a setting item specifying whether the self-device is to automatically perform an update operation based on the common update information stored in the self-device. When "perform" is specified in "automatic download" and "perform" is specified in "automatic update", the function update control unit 250 automatically performs an update operation based on the common update information automatically downloaded by the synchronization control unit 240.

"(Perform or do not perform) manual update" is a setting item specifying whether the self-device is to manually perform an update operation based on the common update information stored in the self-device. When "perform" is specified in "automatic download" and "perform" is specified in "manual update", the synchronization control unit 240 automatically downloads the common update information and stores it in the setting information unit 210 of the self-device. However, the update operation based on the common update information is performed manually, and therefore the user of the self-device determines the quality of the downloaded common update information and instructs the function update control unit 250 to perform the update operation accordingly. When either one of "automatic update" and "manual update" is specified as "perform", the other one is specified as "do not perform". Accordingly, it can be selected whether to perform the update operation automatically or manually.

The "version selection (select from downloaded version)" is a setting item for selecting which version of common update information is to be used by the self-device for the update operation among the plural versions of the common update information stored in the self-device, i.e., for selecting the version used for the update operation. Typically, the version of the common update information is continuously updated by the issuing source. Under such circumstances, the latest version of common update information is not always appropriate for the update operation. The safety in using the common update information of each version is preferably confirmed before applying it to the device. Thus, when "perform" is specified in "manual update" and "perform" is specified in "version selection", the user can select which version of common update information is to be applied to the self-device by manual update.

"Reflect version selection in network synchronization (reflect or do not reflect)" is a setting item specifying whether the setting of the "version selection (select from downloaded version)" is to be reflected in the other devices. For example, when "perform" is specified in "manual update" and "do not reflect" is specified in "reflect version selection in network synchronization", the update operation is performed manually. Then, the setting of "reflect version selection in network synchronization" is changed to "reflect", and the synchronization control unit 240 uses the mechanism of network synchronization to reflect the "version selection" of the own-device to another device. Accordingly, the other device performs network synchronization between the self-device to perform the update operation based on the same version of update information as that of the self-device.

"Notify download/upload (notify or do not notify)" is a setting item for specifying whether to notify the user, for example, by e-mail, that the downloading of the common update information and/or the updating based on the common update information has been completed in the self-device. When "notify" is specified, a notification is sent to the user with an e-mail generated based on contents set with setting items of "subject (for example, displaying 01 through 256 characters)" and "main text (for example, displaying 01 through 2,048 characters)". Sentences are prepared beforehand, such as "Download completed on Month/Day/Time" as the subject and "The download has been completed at Month/Day/Time. The following contents have been downloaded." as the main text. The function update control unit 250 uses these to send a notification to the user. When "perform" is specified in "automatic download" and "perform" is specified in "manual update", after the common update information is downloaded, the user who has received a notification by e-mail performs a manual update operation based on the downloaded common update information.

Next, a description is given of "settings for automatic reboot". The "settings for automatic reboot" is for specifying whether the self-device is to be automatically rebooted.

"(Perform or do not perform) automatic reboot" is a setting item specifying whether the self-device is to be automatically rebooted. For example, when an update based on the common update information is to be provided when the self-device is rebooted, this setting item is specified as "perform".

The "automatic reboot time (for example, 00:00 through 23:59)" is a setting item for specifying the time when the self-device is to be automatically rebooted. When "perform"

is specified in "automatic reboot", the function update control unit 250 automatically reboots the self-device at the specified execution time. When an update based on the common update information is to be provided at the time when the self-device is rebooted, the update based on the common update information is performed at the same time as when the self-device is rebooted. This execution time may be specified by the user. A time when the self-device is unlikely to be in use (for example, 04:00) may be specified.

The synchronization setting information shown in FIG. 18 is described above. Based on such synchronization setting information, the synchronization control unit 240 implements various control operations pertaining to network synchronization. The function update control unit 250 implements control operations for updating the functions, based on the settings for update information in the synchronization setting information.

Accordingly, the following advantages are achieved. That is, common update information can be applied to other MFPs, simply by having a certain MFP included in the network synchronization system 1 acquire common update information via a download server on the Internet and transfer it to other MFPs by network synchronization, or by applying the common update information to a certain MFP and then reflecting the settings that are to be applied including the version information to the other MFPs by network synchronization.

A description of the operations of network synchronization is given below. First, a description is given of an operation for downloading (acquiring/transferring) the common update operation, and then a description is given of an update operation. These operations are described with reference to the system configuration shown in FIG. 6.

(Network Synchronization Operation (Download))

An operation of downloading the common update information is described. Specifically, in the MFP 2b, "via download server" is specified in "download method" of FIG. 18, and the MFP 2b downloads the common update information via the download server. Then, the common update information is uploaded to the synchronization-use common storage unit 320 of the self-device.

Figure 19:
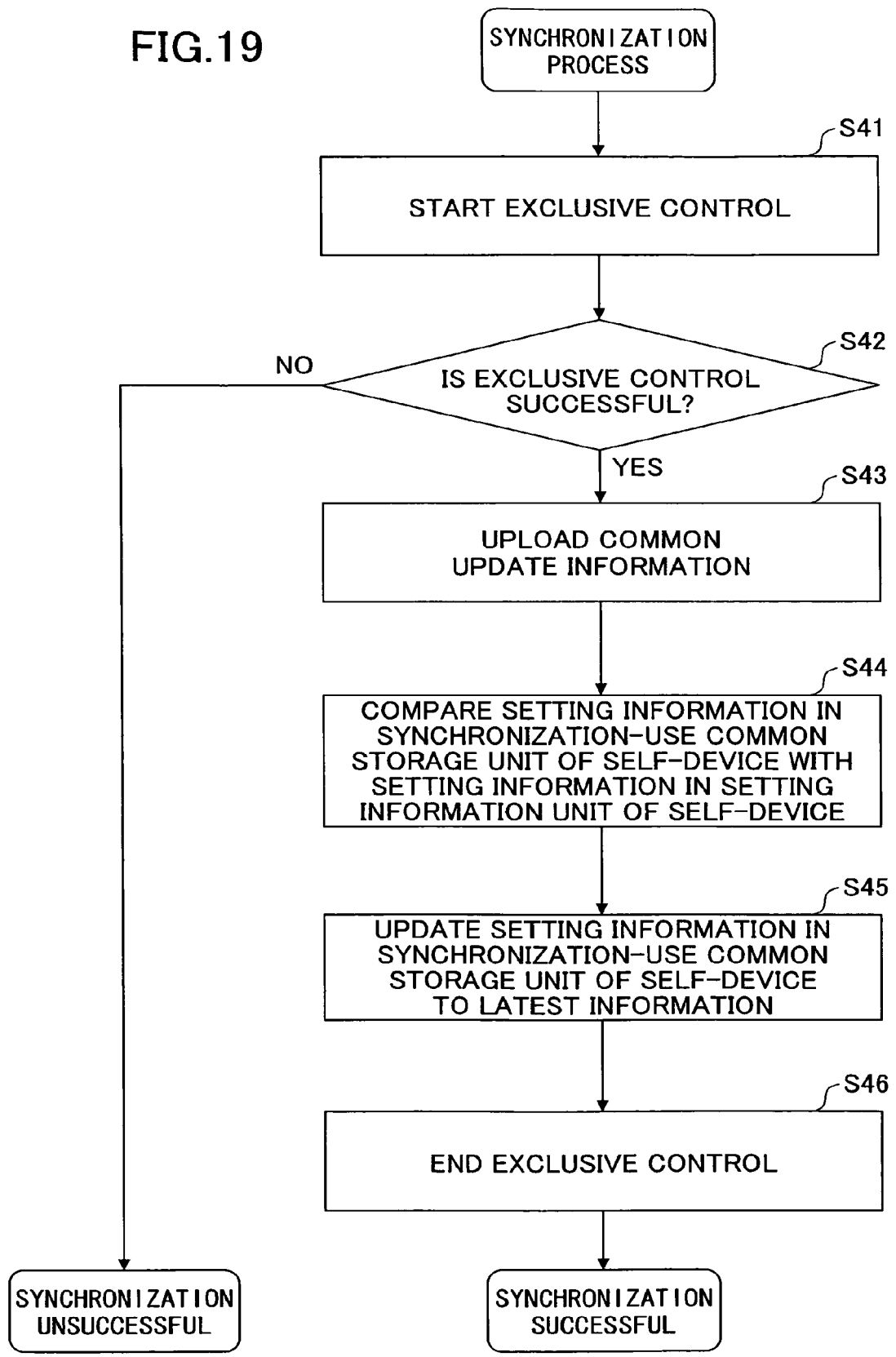
FIG. 19 is a flowchart of an example of a synchronization process (downloading via the download server) according to the second embodiment of the present invention.

The operation of network synchronization (downloading via the download server) performed by the MFP according to the second embodiment is the same as that of the first embodiment (see FIG. 9). However, the synchronization process (step S3 in FIG. 9) is different, and therefore a description is given of the synchronization process. FIG. 19 is a flowchart of an example of the synchronization process (downloading via the download server) according to the second embodiment.

The processes of steps S41 through S46 shown in FIG. 19 are the same as those of steps S11 through S15 shown in FIG. 10 with the exception of step S43, and therefore a description is given only for step S43.

In step S43, the MFP 2b uploads the common update information (step S43). The synchronization control unit 340 of the MFP 2b uploads, into the synchronization-use common storage unit 320, the common update information that it has downloaded. By performing this process, another MFP (for example, the MFP 2a) can acquire the common update information from the synchronization-use common storage unit 320 by network synchronization.

Next, a description is given on how the MFP 2a, in which "via network synchronization" is specified in "download method" of FIG. 18, downloads the common update information from the MFP 2b by network synchronization.

Figure 20:
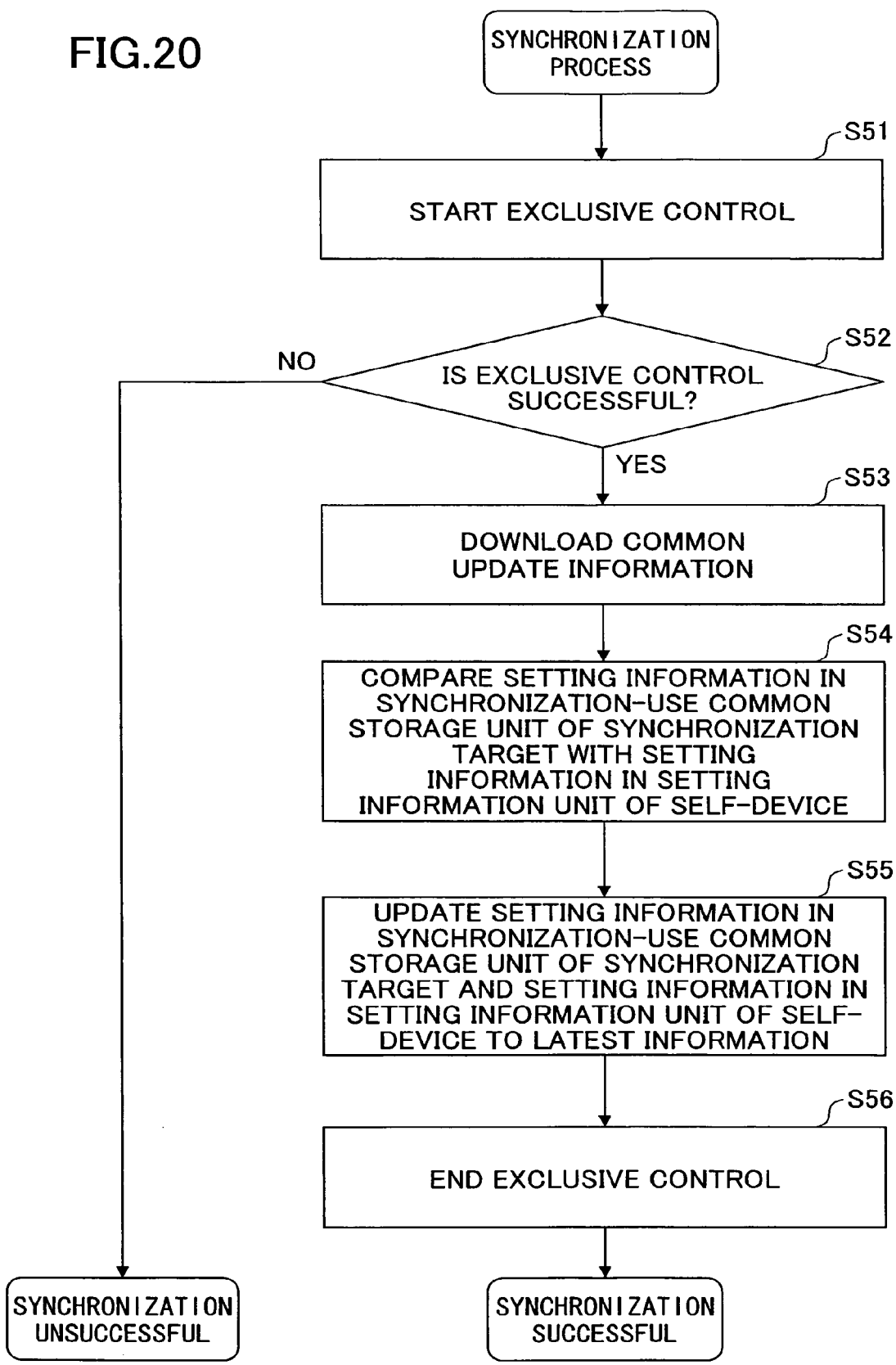
FIG. 20 is a flowchart of an example of a synchronization process (downloading via network synchronization) according to the second embodiment of the present invention.

The operation of network synchronization (downloading via network synchronization) performed by the MFP according to the second embodiment is the same as that of the first embodiment (see FIG. 11). However, the synchronization process (step S3 in FIG. 11) is different, and therefore a description is given of the synchronization process. FIG. 20 is a flowchart of an example of the synchronization process (downloading via network synchronization) according to the second embodiment.

The processes of steps S51 through S56 shown in FIG. 20 are the same as those of steps S31 through S35 shown in FIG. 12, with the exception of step S53, and therefore a description is given only for step S53.

In step S53, the MFP 2a downloads the common update information (step S53). The synchronization control unit 240 downloads the common update information from the synchronization-use common storage unit 320. By performing this process, a certain MFP included in the network synchronization system 1 can transfer the common update information acquired via a download server such as the Internet, to other MFPs, by network synchronization.

(Example of Network Synchronization Operation (Manual Update))

Next, a description is given of the update operation based on the common update information. When "perform" is specified in "automatic update" of FIG. 18, the update is automatically performed when the device is rebooted, and therefore no further descriptions are made regarding "automatic update".

When "perform" is specified in "manual update" and "do not reflect" is specified in "reflect version selection in network synchronization" in the MFP 2b, after the update is performed manually in the MFP 2b, "reflect version selection in network synchronization" is changed to "reflect". Then, the synchronization control unit 340 of the MFP 2b renews the information pertaining to the "version selection" in the synchronization-use common storage unit 320.

Another MFP (for example, the MFP 2a) can acquire the information pertaining to "version selection" from the synchronization-use common storage unit 320 by network synchronization with the MFP 2b. Then, the other MFP 2a may perform the update operation based on the common update information indicated by the "version selection" when it is rebooted.

By performing the above process, common update information can be applied to other MFPs, simply by applying the common update information to a certain MFP included in the network synchronization system 1, and then reflecting the settings that are to be applied including the version information, to the other MFPs by network synchronization.

Third Embodiment

A description is given of a third embodiment according to the present invention with reference to FIGS. 21 through 25. The mechanism of network synchronization described in the first embodiment is used to associate the same setting information managed separately in two different MFPs. A predetermined user can print out, with a certain MFP, a sheet (QR cover sheet) including a QR code recording the user ID of the user managed in the certain MFP, for logging into the certain MFP. With the use of this sheet, the user can log into the certain MFP and also another MFP. That is, when an instruction for logging into the self-device is received from a user of another MFP, the user of the other MFP can log into the self-device based on user information in the self-device that is associated with the user of the other MFP, in the user authentication information shown in FIG. 4.

Figure 24:
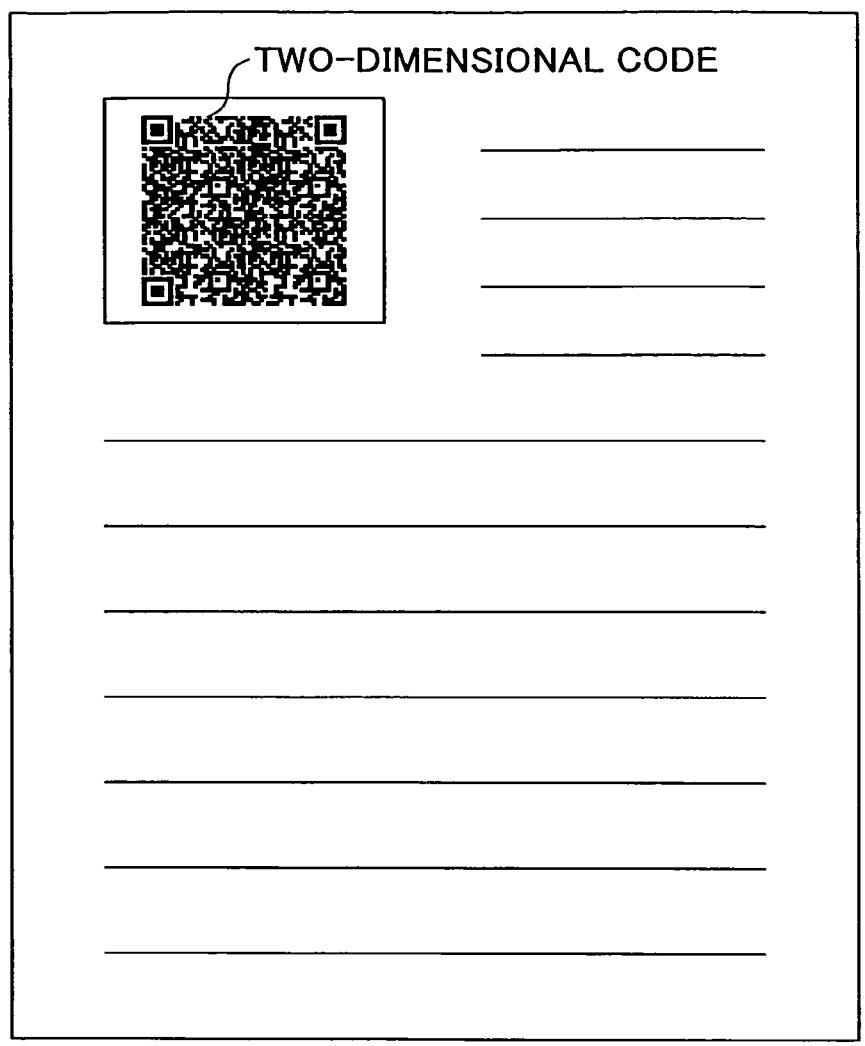
FIG. 24 illustrates an example of acquired image information.

In the following description, the user ID constitutes one of the identification information items recorded in the QR code shown in FIG. 24.

(Configuration of Device)

Figure 21:
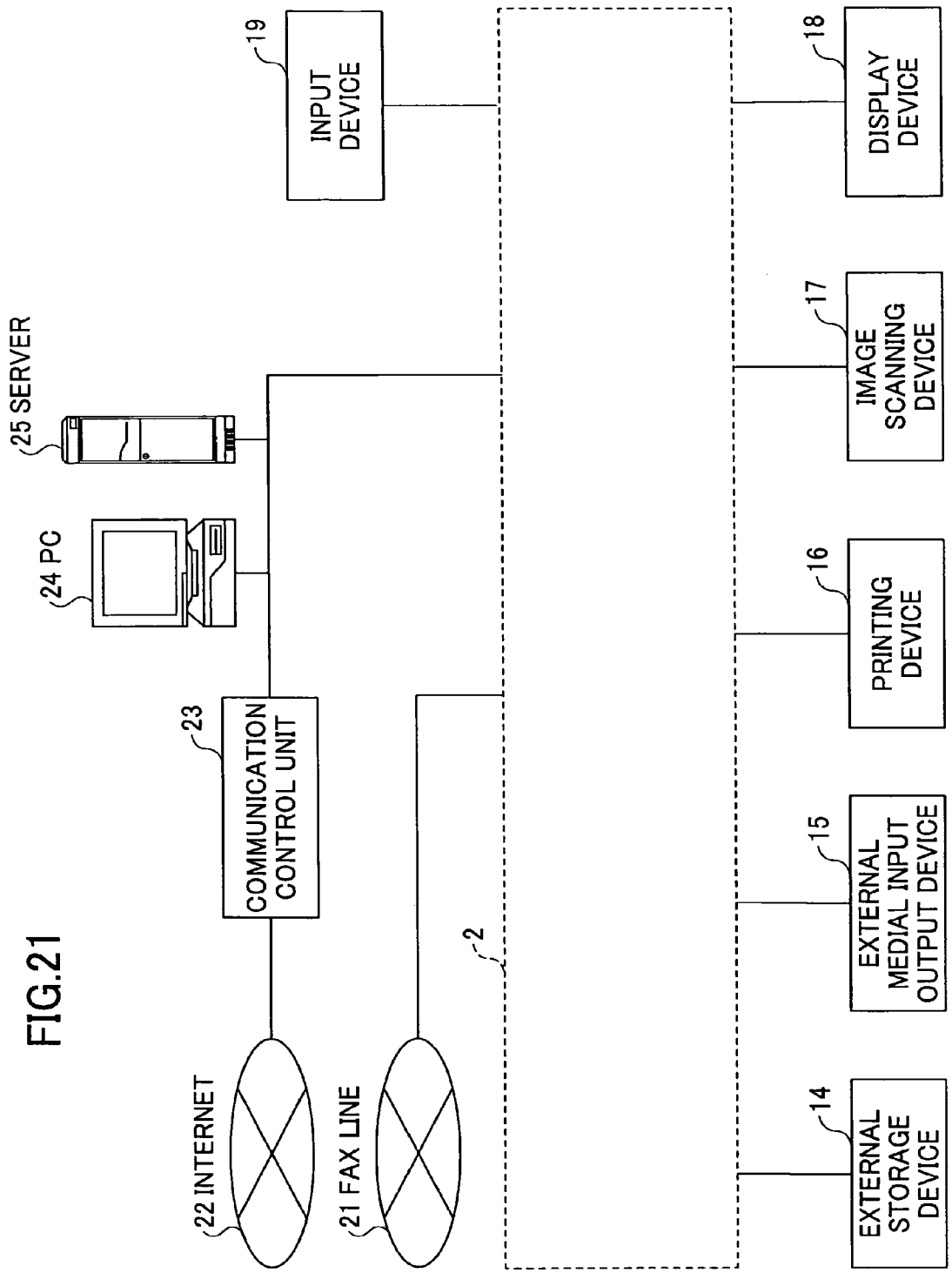
FIG. 21 is a block diagram of an MFP according to a third embodiment of the present invention.

FIG. 21 is a block diagram of the MFP according to a third embodiment of the present invention. As shown in FIG. 21, the MFP 2 is connected, via a bus, to an external storage device 14, an external medial input output device 15, a printing device 16, an image scanning device 17, a display device 18, and an input device 19.

When the MFP 2 exchanges fax data with another fax machine via a fax line 21, the MFP 2 is connected to an external device via the Internet 22 through communication control units 23 such as a modem and a router, and connects to a personal computer (hereinafter, "PC") 24 and a server computer (hereinafter, "server") 25 in a wired or wireless manner to exchange information.

The MFP 2 includes a CPU (Central Processing Unit) (not shown) for controlling the various devices connected to the MFP 2, a memory unit including a ROM (Read Only Memory) and a RAM (Random Access Memory), a fax control unit, a LAN control unit, an input/output device control unit, a storage device control unit, an image processing control unit, and an input control unit. Furthermore, the MFP 2 includes a storage device including a built-in hard disk drive (hereinafter, "HDD") connected to the storage device control unit, a print control unit connected to the image processing control unit, an image scanning control unit, and a display control unit.

The external storage device 14 is a storage device such as an external HDD (Hard Disk Drive). The external medial input output device 15 is for inputting/outputting information to/from media such as a multimedia card (registered trademark), smart media (registered trademark), a memory stick (registered trademark), an SD memory card (registered trademark), a CD-ROM, a floppy disk (registered trademark), and a USB memory (registered trademark).

The printing device 16 is an output device such as a laser printer or an inkjet printer for performing monochrome printing, color printing, and double-sided printing. The image scanning device 17 is for scanning an original image by an optical process to obtain electronic data. The display device 18 is an output device including a touch panel, a CRT, and a liquid crystal display.

The input device 19 is for inputting information with a touch panel and keybuttons. The input device 19 can be a microphone for inputting information by sound.

As described above, the MFP 2 according to the third embodiment controls the various devices connected to (or included in) the MFP 2.

The MFP 2 implements control to identify the image information acquired with the image scanning device 17 in accordance with identification information included in the image information, and to output (or store) the image information. The identification information is for identifying an output file name (or a saving file name) in the computer. The MFP 2 performs a process of outputting the image information by applying the identification information included in the image information acquired by the image scanning device 17 as the output file name.

Accordingly, when the image information is output (or stored), the identification information of the image information (for example, header information) can be effectively set. Detailed configurations are described below with reference to FIG. 22.

(Functional Configuration)

Figure 22:
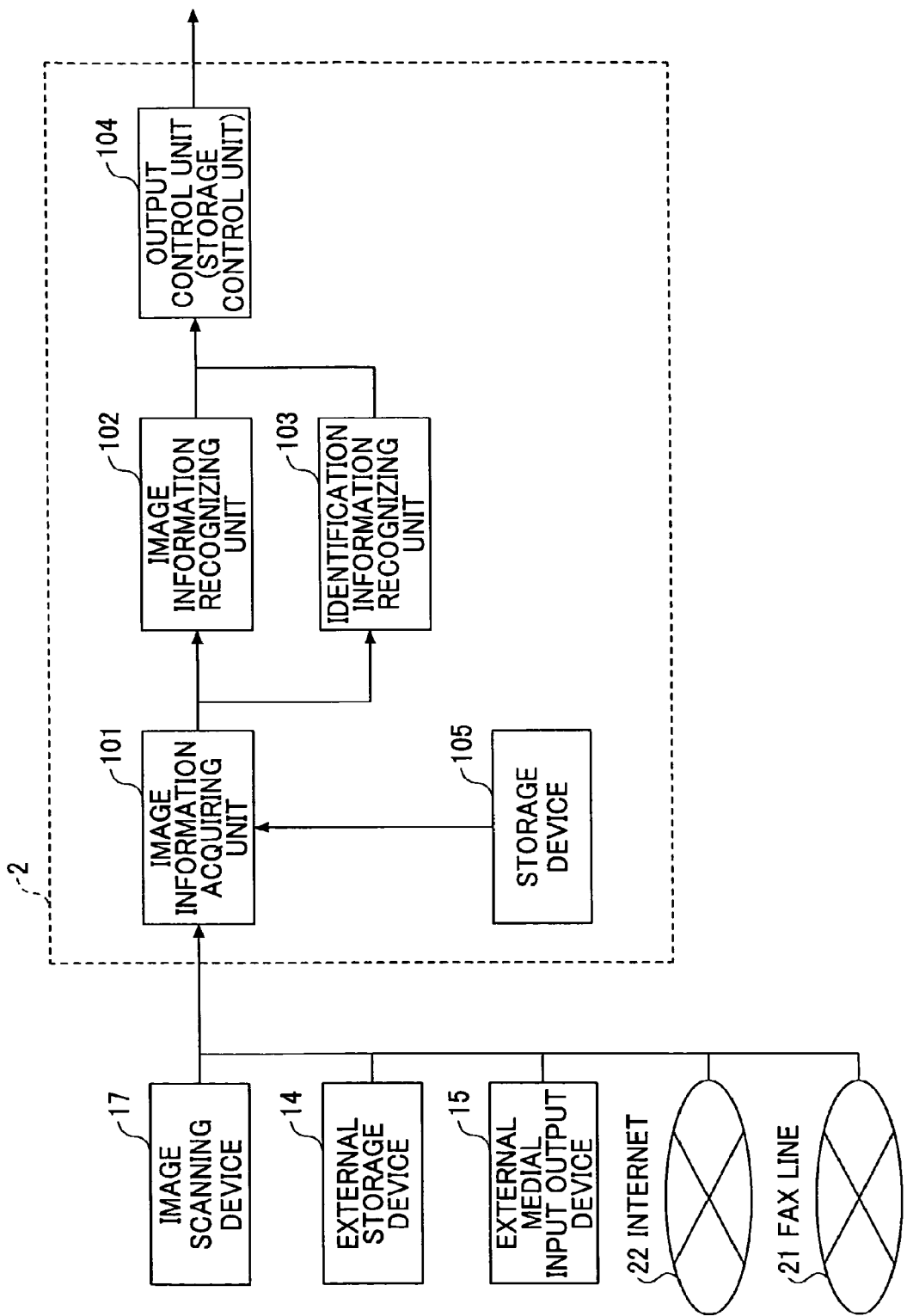
FIG. 22 is a functional block diagram of the MFP according to the third embodiment of the present invention.

FIG. 22 is a functional block diagram of the MFP according to the third embodiment. The arrows between the blocks in FIG. 22 indicate a representative flow of signals, but do not limit the functions of the blocks.

As shown in FIG. 22, the MFP 2 includes an image information acquiring unit 101, an image information recognizing unit 102, an identification information recognizing unit 103, an output control unit (storage control unit) 104, and a storage device 105.

The image information acquiring unit 101 acquires image information. For example, the image information acquiring unit 101 acquires image information scanned by the image scanning device 17; image information stored in the external storage device 14, the external medial input output device 15, or the storage device 105; image information received from an external device connected via the Internet 22; and image information based on fax data received from another fax machine via the fax line 21.

The image information recognizing unit 102 recognizes image information acquired by the image information acquiring unit 101. The identification information recognizing unit 103 recognizes identification information included in the image information acquired by the image information acquiring unit 101. For example, the identification information recognizing unit 103 recognizes the identification information based on an optical scanning code such as a QR code (registered trademark) included in the image information. The identification information is used for identifying the image information in a computer, such as an output file name (or a saving file name) relevant to the outputting (or storing) operation performed by the output control unit (storage control unit) 104 described below.

The output control unit (storage control unit) 104 identifies the image information recognized by the image information recognizing unit 102 according to the identification information recognized by the identification information recognizing unit 103, and outputs (or stores) the image information. For example, header information which is identification information is added to the image information, and an image is formed on a recording medium by the printing device 16. In another example, the identification information may be added to the file name or the subject name of an electronic file generated based on the image information, and an output operation is performed to send the image by fax transmission to another fax device via the fax line 21, or to send the image to an external device connected via the Internet 22. Furthermore, identification information is added to the file name (including a document name or a category name) of the electronic file generated based on the image information, and the electronic file is stored in the storage device 105.

With the above functional configuration, the MFP 2 identifies the image information acquired by the image scanning device 17 according to the identification information included in the image information, and outputs (or stores) the image information.

(Example of Operation)

Figure 23:
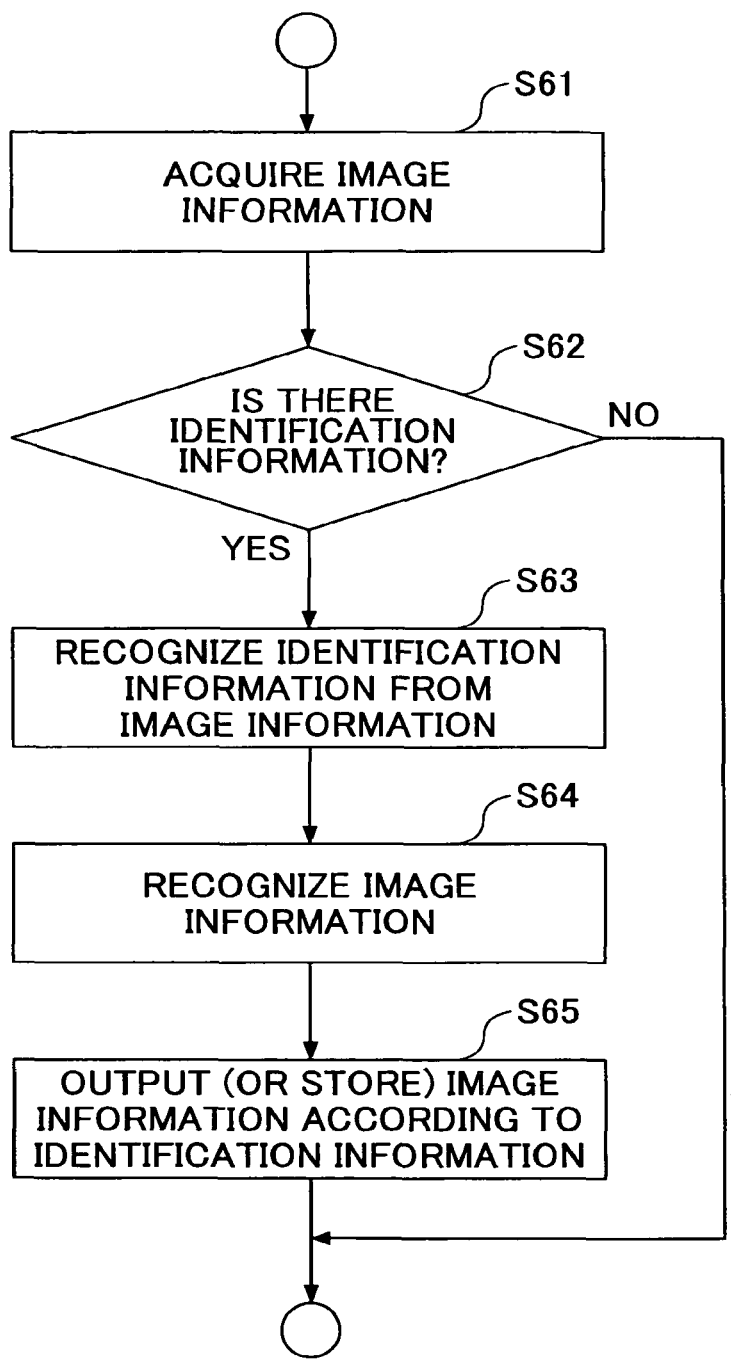
FIG. 23 is a flowchart of an example of an operation performed by the MFP according to the third embodiment of the present invention.

FIG. 23 is a flowchart of an example of an operation performed by the MFP according to the third embodiment. A description is given of an example of an operation performed by the MFP 2 for outputting (or storing) the image information acquired by the image scanning device 17, with reference to the functional block diagram shown in FIG. 22.

First, the image information acquiring unit 101 acquires image information (step S61). Specifically, the image information acquiring unit 101 acquires image information scanned by the image scanning device 17; image information stored in the external storage device 14, the external medial input output device 15, or the storage device 105; image information received from an external device connected via the Internet 22; and image information based on fax data received from another fax machine via the fax line 21. FIG. 24 illustrates an example of acquired image information. The image information used in the third embodiment is image data having a secondary code such as a QR codes recorded at a predetermined position as shown in FIG. 24.

In step S62, the identification information recognizing unit 103 determines whether the image information acquired at step S61 includes identification information (step S62). The identification information is, for example, an output file name (or a saving file name), which is used for identifying the image information in a computer, as described above. In this example, the predetermined character string included in the QR code shown in FIG. 24 is used as the identification information.

When there is identification information (Yes in step S62), the flow proceeds to step S63, where the identification information recognizing unit 103 recognizes the identification information from the image information (step S63). In this example, the predetermined character string included in the QR code shown in FIG. 24 is recognized. When there is no identification information (No in step S62), the process ends.

Figure 25A:
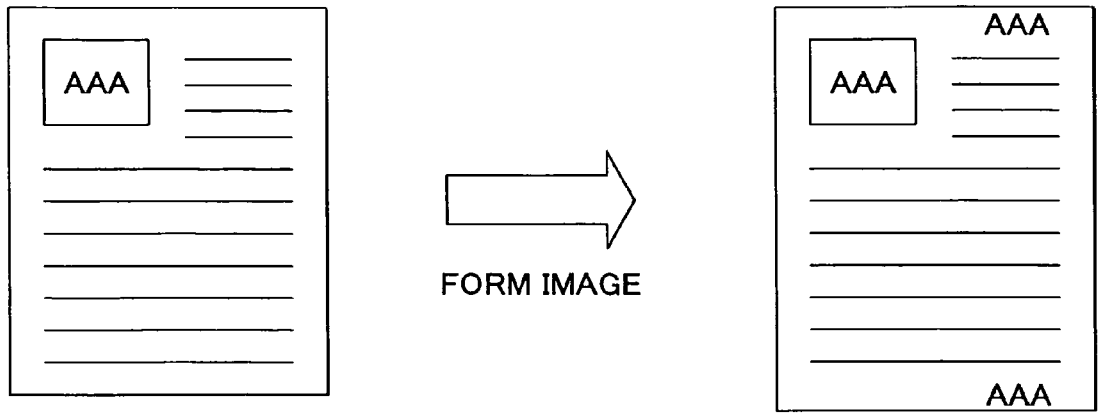
FIGS. 25A through 25C illustrate processes of outputting or storing image information acquired according to identification information.
Figure 25B:
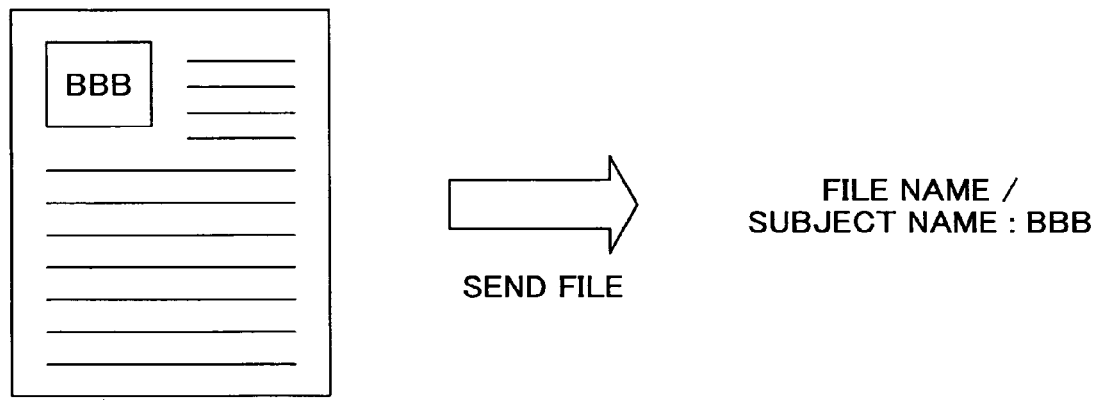
Figure 25C:
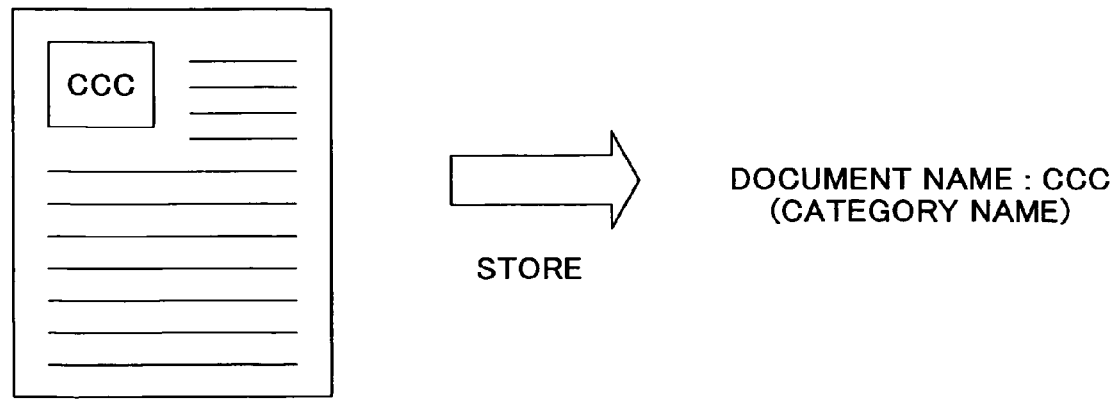

In step S64, the image information recognizing unit 102 recognizes the image information acquired at step S61 (step S64). In this example, the image information shown in FIG. 24 is recognized. Next, in step S65, the output control unit 104 outputs (or stores) the image information recognized at step S64 according to the identification information recognized at step S63 (step S65). FIGS. 25A through 25C illustrate processes of outputting or storing image information according to identification information.

In step S65, the predetermined character string recognized at step S63 is added as header information to the image information, and an image is formed on a recording medium by the printing device 16 (see FIG. 25A). In another example, identification information is added to the file name or the subject name of the electronic file generated based on image information, and an output operation is performed to send the image by fax transmission to another fax device via the fax line 21, or to send the image to an external device connected via the Internet 22 (see FIG. 25B). In yet another example, identification information is added to the file name (including a document name or a category name) of the electronic file generated based on the image information, and the electronic file is stored in the storage device 105 (see FIG. 25C).

By performing the above process, the MFP 2 identifies the image information acquired by the image scanning device 17 according to the identification information included in the image information, and outputs (or stores) the image information. Accordingly, by recording beforehand an output file name (or a saving file name) in a two-dimensional code such as a QR code as shown in FIG. 24, the identification information of the image information can be effectively set when outputting (or storing) the image information.

The present invention is not limited to the specifically disclosed embodiment, and variations and modifications may be made without departing from the scope of the present invention.

The present application is based on Japanese Priority Patent Application No. 2008-070380, filed on Mar. 18, 2008, the entire contents of which are hereby incorporated herein by reference.

What is claimed is:

1. A synchronization system including a plurality of information processing devices, the synchronization system comprising:
a first information processing device among the plurality of information processing devices, the first information processing device including,
a first processor and a first memory, wherein
the first memory is configured to store first user information indicating information of a user, and a date when the first user information was deleted;
a second information processing device among the plurality of information processing devices including,
a second processor and a second memory, wherein
the second memory is configured to store second user information indicating information of the user, a date when the user indicated by the second user information logged into the second information processing device, and
the second processor is configured to,
acquire the date when the first user information was deleted information stored in the first memory, and
store the second user information in the first memory, when the date when the user indicated by the second user information logged into the second information processing device is more recent than the date when the first user information was deleted.

2. The synchronization system of claim 1, wherein the date when the first user information was deleted and the date of logging into the second information processing device each include a time and date.

3. The synchronization system according to claim 1, wherein the second processor is configured to delete the second user information when the date when the user indicated by the second user information logged into the second information processing device is older than the date when the first user information was deleted.

4. An information processing device comprising:
a processor and a memory, wherein
the memory is configured to store second user information indicating information of a user, a date when the user indicated by the second user information logged into the information processing device, and
the processor is configured to
acquire, from another information processing device, a date when first user information indicating information of the user stored in the another information processing device was deleted, and
store the second user information in the another information processing device when the date when the user indicated by the second user information logged into the information processing device is more recent than the date when the first user information was deleted.

5. A non-transitory computer readable medium storing computer readable instructions that, when executed by a processor of an information processing device, performs a synchronization method of:
storing, using the processor, second user information indicating information of a user, a date when the user indicated by the second user information logged into the information processing device; and acquiring, using the processor, from another information processing device, a date when first user information indicating information of the user stored in the another information processing device was deleted, and storing the second user information in the another information processing device when the date when the user indicated by the second user information logged into the information processing device is more recent than the date when the first user information was deleted.

\* \* \* \* \*